US008649625B2

(12) United States Patent
Tsukada

(10) Patent No.: US 8,649,625 B2
(45) Date of Patent: Feb. 11, 2014

(54) METHOD, DEVICE AND PROGRAM FOR MEASURING IMAGE QUALITY ADJUSTING ABILITY, AND METHOD, DEVICE AND PROGRAM FOR ADJUSTING IMAGE QUALITY

(75) Inventor: Masato Tsukada, Minato-ku (JP)

(73) Assignee: NEC Corporation, Tokyo (JP)

( * ) Notice: Subject to any disclaimer, the term of this patent is extended or adjusted under 35 U.S.C. 154(b) by 808 days.

(21) Appl. No.: 12/597,147

(22) PCT Filed: Apr. 18, 2008

(86) PCT No.: PCT/JP2008/057570
§ 371 (c)(1),
(2), (4) Date: Oct. 22, 2009

(87) PCT Pub. No.: WO2008/133195
PCT Pub. Date: Nov. 6, 2008

(65) Prior Publication Data
US 2010/0129001 A1    May 27, 2010

(30) Foreign Application Priority Data

Apr. 25, 2007  (JP) .................................. 2007-115611

(51) Int. Cl.
*G06K 9/00*  (2006.01)
*G06K 9/68*  (2006.01)
*G06K 9/40*  (2006.01)
*G06K 9/36*  (2006.01)
*G06K 9/64*  (2006.01)

(52) U.S. Cl.
USPC ........... 382/254; 382/278; 382/276; 382/219; 382/112

(58) Field of Classification Search
USPC ......................................... 382/254, 278, 276
See application file for complete search history.

(56) References Cited

U.S. PATENT DOCUMENTS 5,719,661 A * 2/1998 Terashita ........................ 355/38
5,809,171 A * 9/1998 Neff et al. ..................... 382/209
(Continued)

FOREIGN PATENT DOCUMENTS

JP   08-098035 A   4/1996
JP   11-511318 A   9/1999
(Continued)

OTHER PUBLICATIONS

Masato Tsukada, et al., "Automatic Image Quality Improvement Technique and Digital Image Processing", Journal of the Imaging Society of Japan, 2004, pp. 90-97, vol. 43, No. 2.

(Continued)

*Primary Examiner* — Michelle Entezari
(74) *Attorney, Agent, or Firm* — Sughrue Mion, PLLC

(57) ABSTRACT

An image quality adjustment capability measurement method includes the steps of: using an instructor image serving as a target for the image qualities of an evaluation image and a correlation function between image quality characteristic differences and image quality adjustment capability values, the instructor image and the correlation function being obtained in advance; inputting a corrected image obtained after the image qualities of the evaluation image is adjusted; calculating the image quality characteristic difference between the input corrected image and the instructor image; and calculating the image quality adjustment capability value from the correlation function between the image quality characteristic differences and the image quality adjustment capability values, which is obtained in advance, and the calculated image quality characteristic difference.

3 Claims, 13 Drawing Sheets

(56) References Cited

U.S. PATENT DOCUMENTS

| | | | | |
|---|---|---|---|---|
| 5,835,627 | A * | 11/1998 | Higgins et al. | 382/167 |
| 5,890,808 | A * | 4/1999 | Neff et al. | 382/209 |
| 5,940,524 | A * | 8/1999 | Murayama et al. | 382/112 |
| 5,946,422 | A * | 8/1999 | Neff et al. | 382/278 |
| 6,126,449 | A * | 10/2000 | Burns | 434/252 |
| 6,639,999 | B1 * | 10/2003 | Cookingham et al. | 382/112 |
| 6,658,139 | B1 | 12/2003 | Cookingham et al. | |
| 6,813,390 | B2 * | 11/2004 | Ali | 382/278 |
| 6,879,735 | B1 * | 4/2005 | Portniaguine et al. | 382/275 |
| 6,912,071 | B1 * | 6/2005 | Rasmussen et al. | 358/406 |
| 6,961,468 | B2 * | 11/2005 | Huang et al. | 382/218 |
| 7,010,159 | B2 * | 3/2006 | Ali | 382/155 |
| 7,076,101 | B2 * | 7/2006 | Chung et al. | 382/218 |
| 7,092,571 | B2 * | 8/2006 | Hsieh | 382/209 |
| 7,227,973 | B2 * | 6/2007 | Ishiyama | 382/103 |
| 7,362,354 | B2 * | 4/2008 | Lin | 348/222.1 |
| 7,551,791 | B2 * | 6/2009 | Poon et al. | 382/254 |
| 7,801,385 | B2 * | 9/2010 | Chiu | 382/254 |
| 7,957,561 | B2 * | 6/2011 | Joung et al. | 382/112 |
| 8,346,003 | B2 * | 1/2013 | Shiraki et al. | 382/254 |
| 8,452,115 | B2 * | 5/2013 | Chen et al. | 382/254 |
| 8,503,822 | B2 * | 8/2013 | Yamada | 382/278 |
| 2003/0061236 | A1 * | 3/2003 | Culp et al. | 707/104.1 |
| 2003/0086618 | A1 * | 5/2003 | Nagaishi | 382/229 |
| 2003/0146997 | A1 * | 8/2003 | Fredlund et al. | 348/333.02 |
| 2004/0057029 | A1 * | 3/2004 | Schindler et al. | 355/40 |
| 2007/0154084 | A1 * | 7/2007 | Kang et al. | 382/162 |
| 2008/0032739 | A1 * | 2/2008 | Hoodbhoy et al. | 455/556.2 |

FOREIGN PATENT DOCUMENTS

| | | |
|---|---|---|
| JP | 2000-285151 A | 10/2000 |
| JP | 2002-199216 A | 7/2002 |
| JP | 2003-223641 A | 8/2003 |
| JP | 2006-080746 A | 3/2006 |
| JP | 2006-139368 A | 6/2006 |
| WO | 97/48076 A1 | 12/1997 |

OTHER PUBLICATIONS

Wang et al., "Why Is Image Quality Assessment So Difficult?", 2002 IEEE International Conference on Acoustics, Speech, and Signal Processing, May 13-17, 2002, vol. 4, pp. 3313-3316, XP032015547, ISBN: 978-0-7803-7402-7.

Communication dated Oct. 30, 2013, issued by the European Patent Office in corresponding Application No. 08740625.2.

* cited by examiner

METHOD, DEVICE AND PROGRAM FOR MEASURING IMAGE QUALITY ADJUSTING ABILITY, AND METHOD, DEVICE AND PROGRAM FOR ADJUSTING IMAGE QUALITY

TECHNICAL FIELD

The present invention relates to an image quality adjustment capability measurement method, device and program, and an image quality adjustment method, device and program. The present invention particularly relates to an image quality adjustment capability measurement method, device and program that measure the image qualities of color images adjusted by a person or color image system, which a person subjectively perceives, as an objective value. Moreover, the present invention relates to an image quality adjustment method, device and program that are based on an objective value representing the image quality adjustment capability of a person or color image system. Furthermore, the present invention relates to an image quality adjustment capability training method, device and program that are based on an objective value representing the image quality adjustment capability of a person or color image system.

BACKGROUND ART

In a color image device or color image processing system, the image qualities of color images are an extremely important factor. Therefore, careful setting is necessary for the image quality of color images realized by the color image device or color image processing system. Here, the focus is put on such image qualities as brightness of an entire image, gamma characteristics, and sharpness, which can be arbitrarily adjusted by image processing, not on such image qualities as the physically determined limit values of white or black in brightness or density and the color gamut of devices, which are attributable to hardware characteristics. The image qualities represent the capability and characteristics of the color image device or color image processing system. Therefore, setting of the image qualities is an extremely important factor.

Now the setting of such image qualities is performed primarily based on the detailed evaluation and adjustment of image qualities by engineers. According to the method, the image qualities set in the color image device or color image system are mostly affected by the skill (capability) of a person who makes sure of the image qualities of color images in the color image device or color image system to adjust the image qualities. That is, in the color image device or color image processing system, an engineer who has a high capability in adjusting image qualities is required in order to appropriately stabilize the image qualities as expected.

These days, various kinds of color image devices, such as PDP (Plasma Display Panel), LCD (Liquid Crystal Display), printers, camera-equipped cellular phones, and projectors, are put into the market. When just one component used to form an image is replaced in a device, the image qualities change. Therefore, the adjustment of image qualities is performed each time the component is replaced. Moreover, even if the configuration of components is the same, the image qualities to be expressed may change according to type of device. Even if the type of device is the same, there may be a plurality of image quality modes. In each case, the adjustment of image qualities is necessary.

A completely automated method for adjustment or setting of image qualities or designing thereof has not yet been realized. Therefore, in order to put various kinds of such color image devices into the market, it is necessary to have many engineers who have high capabilities in adjusting image qualities. However, it takes enormous time and efforts to improve people's image quality adjustment capabilities because the technique is learned through the actual work of adjusting image qualities. Accordingly, it is effectively impossible to gather many engineers who have high capabilities in adjusting image qualities in a short period of time. Therefore, the adjustment of image qualities of color image devices, the various types of which are increasingly put into the market, is currently performed by a small number of engineers who spend much energy and production processes for the adjustment.

The following Patent Documents 1 and 2 disclose conventional arts related to the above-described image processing.

Patent Document 1 proposes an image processing device that includes an input section, an instructor data extraction section, a correction section, and an image processing section in order to intuitively and easily convey favorite image reproduction to the image processing device so that the favorite image reproduction is reflected in the image process. The image processing device operates in the following manner: The input section accepts the input instruction of a target image (an instructor image) for image reproduction in the image process; the instructor data extraction section performs analysis or information collection for the predetermined image reproduction items for the instructor image provided, and extracts instructor data representing the tendency of image reproduction; the correction section corrects parameters of the image process in accordance with the tendency of image reproduction represented by the instructor data; the image processing section performs the image process for the input image using the corrected parameters.

Patent Document 2 proposes an image processing device that includes a preliminary correction section, an amount-of-characteristic calculation section, a correction value calculation section, and a correction execution section in order to efficiently perform image qualities of the corrected image of each image among a group of images. The image processing device operates in the following manner: The preliminary correction section preliminarily corrects a sample image among a group of images and obtains the preliminarily corrected image of the sample image; the amount-of-characteristic calculation section calculates the amount of characteristic of each preliminarily corrected image; the target-amount-of-characteristic calculation section calculates the target amount of characteristic such that the variation between the target amount of characteristic and the amount of characteristic of each preliminarily corrected image is minimized; the correction value calculation section calculates a correction value of each image such that the amount of characteristic of each image of the group of images is equal to the target amount of characteristic; the correction execution section uses the correction value to correct the corresponding image.

Patent Document 1: JP-A-2006-080746

Patent Document 2: JP-A-2006-139368

Non-Patent Document 1: Masato Tsukada, Tetsuaki Suzuki, and Akira Inoue, "Automated technique for improving image qualities in digital image processing", Journal of the Imaging Society of Japan, 2004, Vol. 43, No. 2, pp. 90-97

SUMMARY OF INVENTION

Technical Problem

However, the above-mentioned conventional arts have the following challenges.

1) The image qualities of the color image device or color image system depend on the image adjustment capability of the person or color image system performing the adjustment. Accordingly, the first challenge is to establish an image quality adjustment capability measurement method to objectively evaluate the image quality adjustment capability of the person or color image system performing adjustment, in order to obtain the more stabilized image qualities of the color image device or color image system.

2) The second challenge is to automatically adjust the image qualities set in the color image device or color image system to the desired image qualities which a person subjectively perceives.

3) The third challenge is to objectively evaluate the level of performance of the image qualities and present the level when the image qualities set in the color image device or color image system are automatically adjusted to the desired image qualities which a person subjectively perceives.

4) The fourth challenge is to train the image adjustment capability of a person who adjusts the image qualities of the color image device or color image system in accordance with an objective image quality adjustment capability value.

The above challenges are not recognized in the above-mentioned Patent Documents 1 and 2.

An object of the present invention is to provide an image quality adjustment capability measurement method, device and program which can objectively evaluate the image adjustment capability of a person or color image system for a color image device and a color image processing system.

Another object of the present invention is to provide an image quality adjustment method, device and program which can automatically adjust the image qualities for the color image device and the color image processing system in accordance with the above image quality adjustment capability measurement method.

Another object of the present invention is to provide an image quality adjustment capability training method, device and program which can train the image adjustment capability of a person for the color image device and the color image processing system.

Solution to Problem

According to the present invention, a first image quality adjustment capability measurement method includes the steps of: using an instructor image serving as a target for the image qualities of an evaluation image and a correlation function between image quality characteristic differences and image quality adjustment capability values, the instructor image and the correlation function being obtained in advance; inputting a corrected image obtained after the image qualities of the evaluation image are adjusted; calculating the image quality characteristic difference between the corrected image and the instructor image; and calculating the image quality adjustment capability value from the correlation function and the image quality characteristic difference.

Moreover, according to the first image quality adjustment capability measurement method of the present invention, using the instructor image and the correlation function may mean: using the evaluation image, a first corrected image obtained after the image qualities of the evaluation image are adjusted and evaluated in terms of subjective image quality, and an instructor image serving as a target for the image qualities of the evaluation image, the evaluation image, the first corrected image, and the instructor image being obtained in advance; calculating the image quality adjustment capability value for the first corrected image the subjective image qualities of which are evaluated; calculating the image quality characteristic difference between the first corrected image and the instructor image; and using a correlation function between the image quality characteristic difference and the image quality adjustment capability value calculated from the image quality characteristic difference and the image quality adjustment capability value.

Furthermore, according to the present invention, a second image quality adjustment capability measurement method includes the steps of: using a first corrected image obtained after the image qualities of the evaluation image are adjusted and evaluated in terms of subjective image quality and an instructor image serving as a target for the image qualities of the evaluation image, the first corrected image and the instructor image being obtained in advance; calculating an image quality adjustment capability value for the first corrected image; calculating an image quality characteristic difference between the first corrected image and the instructor image, and acquiring a correlation function between the image quality characteristic difference and the image quality adjustment capability value; acquiring a second corrected image by letting a user whose image quality adjustment capability is to be measured adjust the image qualities of the evaluation image; and calculating the image quality characteristic difference between the second corrected image and the instructor image, and calculating the user's image quality adjustment capability value from the correlation function and the image quality characteristic difference.

Furthermore, according to the present invention, a third image quality adjustment capability measurement method includes the steps of: acquiring a first corrected image obtained after the image qualities of a plurality of evaluation images are adjusted; performing subjective evaluation on the image qualities of the first corrected image; calculating an image quality adjustment capability value from the result of subjective evaluation on the image qualities of the first corrected image; calculating the image quality characteristic difference between the first corrected image and an instructor image serving as a target for the image qualities of the evaluation image, and acquiring a correlation function between the image quality characteristic difference and the image quality adjustment capability value; acquiring a second corrected image by letting a user adjust the image qualities of the evaluation image; and calculating the image quality characteristic difference between the second corrected image and the instructor image, and calculating the user's image quality adjustment capability value from the correlation function and the image quality characteristic difference.

According to the present invention, a first image quality adjustment capability measurement device includes: a section that uses a given correlation function between image quality characteristic differences and image quality adjustment capability values; a corrected image input section that inputs a corrected image obtained after the image qualities of an evaluation image are adjusted; an instructor image storage memory that stores an instructor image serving as a target for the image qualities of the evaluation image; an image quality characteristic difference calculation section that calculates the image quality characteristic difference between the corrected image and the instructor image; and an image quality adjustment capability determination section that calculates the image quality adjustment capability value from the correlation function and the image quality characteristic difference.

Moreover, according to the present invention, a second image quality adjustment capability measurement device includes: a section that uses a given correlation function between image quality characteristic differences and image quality adjustment capability values; an evaluation image storage memory that stores an evaluation image; an image processing section that generates a corrected image by letting a user whose image quality adjustment capability is to be measured adjust the image qualities of the evaluation image; an image presentation section that presents the evaluation image and the corrected image to the user; an instructor image storage memory that stores an instructor image serving as a target for the image qualities of the evaluation image; an image quality characteristic difference calculation section that calculates the image quality characteristic difference between the corrected image and the instructor image; and an image quality adjustment capability determination section that calculates the user's image quality adjustment capability value from the correlation function and the image quality characteristic difference.

According to the present invention, an image quality adjustment method includes the steps of: using a given evaluation image, a given instructor image serving as a target for the image qualities of the evaluation image, and a given correlation function between image quality characteristic differences and image quality adjustment capability values; generating correction parameters used in an image process to correct the image qualities of the evaluation image; generating a corrected image by performing the image process for the evaluation image using the correction parameters; calculating the image quality characteristic difference between the corrected image and the instructor image; determining target correction parameters from the correction parameters using the image quality characteristic difference and the correlation function to obtain the desired image qualities; and correcting the image qualities of an arbitrarily input image using the image process and the target correction parameters.

Moreover, according to the image quality adjustment method of the present invention, determining the target correction parameters may include setting a target value for adjusting the desired image qualities.

According to the present invention, an image quality adjustment device includes: a section that uses a given correlation function between image quality characteristic differences and image quality adjustment capability values; an evaluation image storage memory that stores an evaluation image; a correction parameter generation section that generates correction parameters used in an image process to adjust the image qualities of the evaluation image; an image processing section that generates a corrected image by performing the image process for the evaluation image using the correction parameters; an instructor image storage memory that stores an instructor image serving as a target for the image qualities of the evaluation image; an image quality characteristic difference calculation section that calculates the image quality characteristic difference between the corrected image and the instructor image; a target correction parameter determination section that determines target correction parameters from the correction parameters using the image quality characteristic difference and the correlation function to obtain the desired image qualities; and an image correction section that corrects the image qualities of an arbitrarily input image using the image process and the target correction parameters.

Moreover, according to the image quality adjustment device of the present invention, the target correction parameter determination section includes a section that sets a target value for adjusting the desired image qualities.

According to the present invention, a first image quality adjustment capability measurement program causes a computer to execute: a process of using a given correlation function between image quality characteristic differences and image quality adjustment capability values; a process of inputting a corrected image obtained after the image qualities of an evaluation image is adjusted; a process of storing an instructor image serving as a target for the image qualities of the evaluation image; a process of calculating the image quality characteristic difference between the corrected image and the instructor image; and a process of calculating the image quality adjustment capability value from the correlation function between the image quality characteristic differences and the image quality adjustment capability values and the image quality characteristic difference.

Moreover, according to the present invention, a second image quality adjustment capability measurement program causes a computer to execute: a process of using a given correlation function between image quality characteristic differences and image quality adjustment capability values; a process of storing an evaluation image; an image process of generating a corrected image by letting a user whose image quality adjustment capability is to be measured adjust the image qualities of the evaluation image; a process of presenting the evaluation image and the corrected image to the user; a process of allowing the user to control parameters used in the image process; a process of storing an instructor image serving as a target for the image qualities of the evaluation image; a process of calculating the image quality characteristic difference between the corrected image and the instructor image; and a process of calculating the user's image quality adjustment capability value from the correlation function and the image quality characteristic difference.

According to the present invention, an image quality adjustment program causes a computer to execute: a process of using a given correlation function between image quality characteristic differences and image quality adjustment capability values; a process of storing an evaluation image; a process of generating correction parameters used in an image process to adjust the image qualities of the evaluation image; a process of generating a corrected image by performing the image process for the evaluation image using the correction parameters; a process of storing an instructor image serving as a target for the image qualities of the evaluation image; a process of calculating the image quality characteristic difference between the corrected image and the instructor image; a process of determining target correction parameters from the correction parameters using the image quality characteristic difference and the correlation function to obtain the desired image qualities; and a process of correcting the image qualities of an arbitrarily input image using the image process and the target correction parameters.

Moreover, according to the image quality adjustment program of the present invention, the process of determining the target correction parameters may include a process of setting a target value for adjusting the desired image qualities.

According to the present invention, a first image quality adjustment capability training method includes the steps of: using an instructor image serving as a target for the image qualities of an evaluation image and a correlation function between image quality characteristic differences and image quality adjustment capability values, the instructor image and the correlation function being obtained in advance; acquiring a corrected image by letting a user whose image quality adjustment capability is to be measured adjust the image qualities of the evaluation image; calculating the image quality characteristic difference between the corrected image and the instructor image, and calculating the user's image quality adjustment capability value from the correlation function and the image quality characteristic difference; and controlling an image quality adjustment operation in which the user adjusts the image qualities of the evaluation image to obtain the corrected image.

According to the present invention, a second image quality adjustment capability training method includes the steps of: using a first corrected image obtained after the image qualities of an evaluation image are adjusted and evaluated in terms of subjective image quality and an instructor image serving as a target for the image qualities of the evaluation image, the first corrected image and the instructor image being obtained in advance; calculating an image quality adjustment capability value for the first corrected image evaluated in terms of the subjective image quality; calculating an image quality characteristic difference between the corrected image and the instructor image, and acquiring a correlation function between the image quality characteristic difference and the image quality adjustment capability value; acquiring a second corrected image by letting a user whose image quality adjustment capability is to be measured adjust the image qualities of the evaluation image; calculating the image quality characteristic difference between the second corrected image and the instructor image, and calculating the user's image quality adjustment capability value from the correlation function and the image quality characteristic difference; and controlling an image quality adjustment operation in which the user adjusts the image qualities of the evaluation image to obtain the second corrected image.

According to the present invention, an image quality adjustment capability training device includes: a section that uses a given correlation function between image quality characteristic differences and image quality adjustment capability values; an evaluation image storage memory that stores an evaluation image; an image processing section that generates a corrected image by letting a user whose image quality adjustment capability is to be measured adjust the image qualities of the evaluation image; an instructor image storage memory that stores an instructor image serving as a target for the image qualities of the evaluation image; an image quality characteristic difference calculation section that calculates the image quality characteristic difference between the corrected image and the instructor image; an image quality adjustment capability determination section that calculates the user's image quality adjustment capability value from the correlation function and the image quality characteristic difference; and an image quality adjustment operation control section that controls an image quality adjustment operation in which the user adjusts the image qualities of the evaluation image to generate the corrected image.

According to the present invention, an image quality adjustment capability training program causes a computer to execute: a process of using a given correlation function between image quality characteristic differences and image quality adjustment capability values; a process of storing an evaluation image; an image process of generating a corrected image by letting a user whose image quality adjustment capability is to be measured adjust the image qualities of the evaluation image; a process of presenting the evaluation image and the corrected image to the user; a process of allowing the user to control parameters used in the image process; a process of storing an instructor image serving as a target for the image qualities of the evaluation image; a process of calculating the image quality characteristic difference between the corrected image and the instructor image; a process of calculating the user's image quality adjustment capability value from the correlation function and the image quality characteristic difference; and a process of controlling an image quality adjustment operation in which the user adjusts the image qualities of the evaluation image to generate the corrected image.

Advantageous Effects of Invention

The first effect of the present invention is to be able to objectively measure the capability of a person or color image system in adjusting the image qualities of color images for a color image device and a color image processing system.

The second effect of the present invention is to be able to automatically adjust the image qualities set in the color image device and the color image processing system to the desired image qualities which a person subjectively perceives.

The third effect of the present invention is to be able to automatically adjust the image qualities set in the color image device and the color image processing system to the desired image qualities which a person subjectively perceives and furthermore to present the level of performance of the image qualities at that time.

The fourth effect of the present invention is to be able to train the image adjustment capability of a person who adjusts the image qualities of color images for the color image device and the color image processing system.

EXPLANATION OF REFERENCE SYMBOLS

Figure 1:
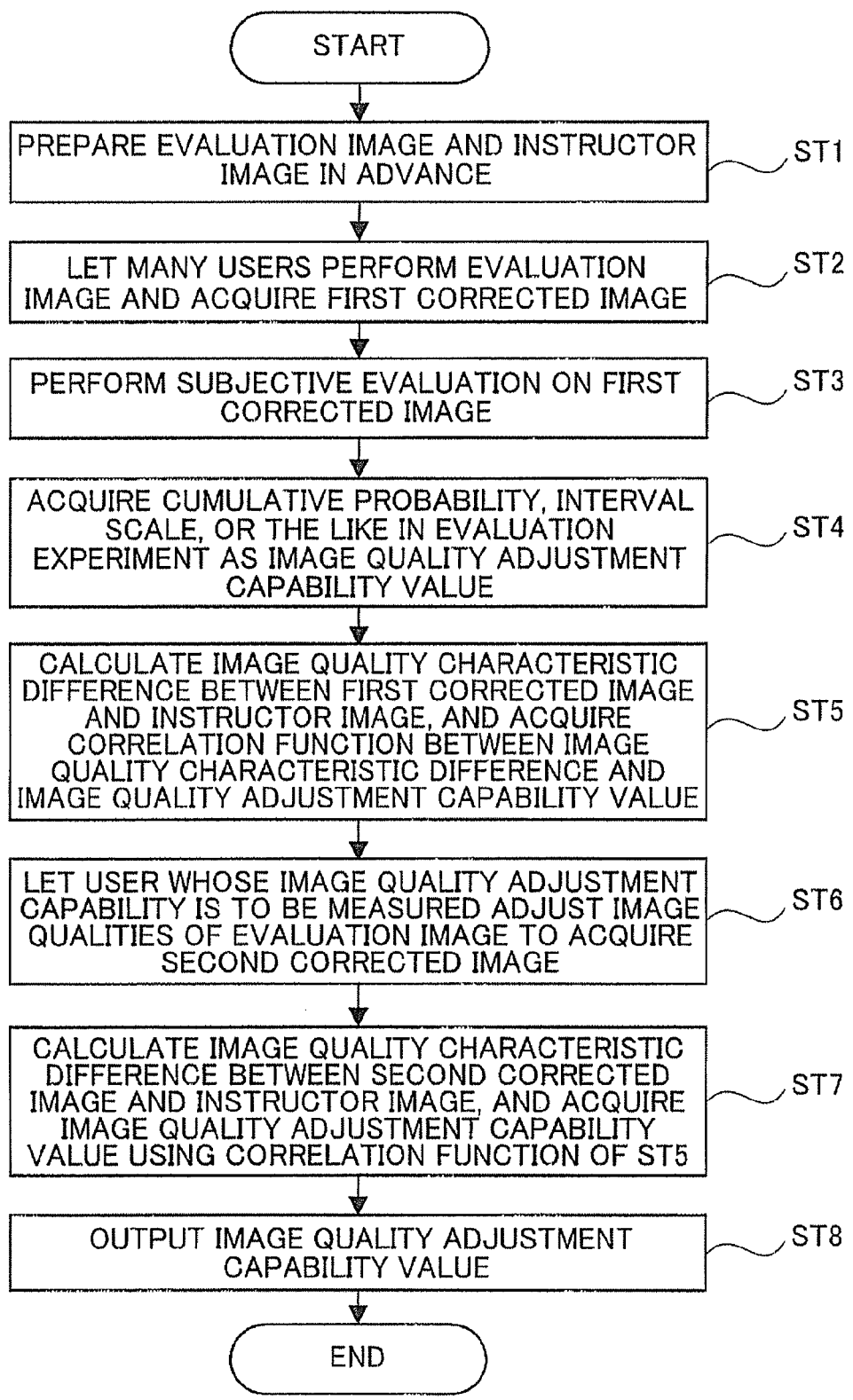
FIG. 1 is a flowchart illustrating the operation of an image quality adjustment capability measurement method according to a first exemplary embodiment of the present invention.

1: Evaluation image storage memory
2: Image processing section
3: Image presentation section
4: Parameter control section
5: Instructor image storage memory
6: Image quality characteristic difference calculation section
7: Image quality adjustment capability determination section
8: Correction parameter generation section
9: Corrected image storage memory
10: Optimum correction parameter determination section
11: Image quality adjustment operation control section
100, 101: Image quality adjustment capability measurement device
102, 103: Image quality adjustment device
104: Image quality adjustment capability training device
200: Image processing tool
300: User interface

DESCRIPTION OF EMBODIMENTS

The following describes exemplary embodiments of the present invention with reference to the accompanying diagrams.

First Exemplary Embodiment

FIG. 1 illustrates the procedure of an image quality adjustment capability measurement method according to a first exemplary embodiment of the present invention.

In FIG. 1, in order to measure the image quality adjustment capability, an evaluation image and an instructor image, which is a target for the evaluation image and has a good image quality, are prepared in advance (step ST1). Here, the evaluation image and the instructor image thereof include not only still images but moving images. For reasons of convenience, still and moving images are not distinguished from each other and are referred to as images.

The evaluation image to be used includes a variety of images of natural images and CG (computer graphics) images, such as night scenes, landscapes, artificial materials, and portraits. A target instructor image is necessary for each scene of the evaluation image. The instructor image includes an evaluation image corrected by an engineer having a high capability in adjusting image qualities with the use of an image processing tool and the like, and other images.

Then, according to the image quality adjustment capability measurement method of the first exemplary embodiment, a first corrected image is generated by letting many users subjectively adjust the image qualities of each scene of the evaluation image with the use of an image processing tool or the like (step ST2).

Figure 2:
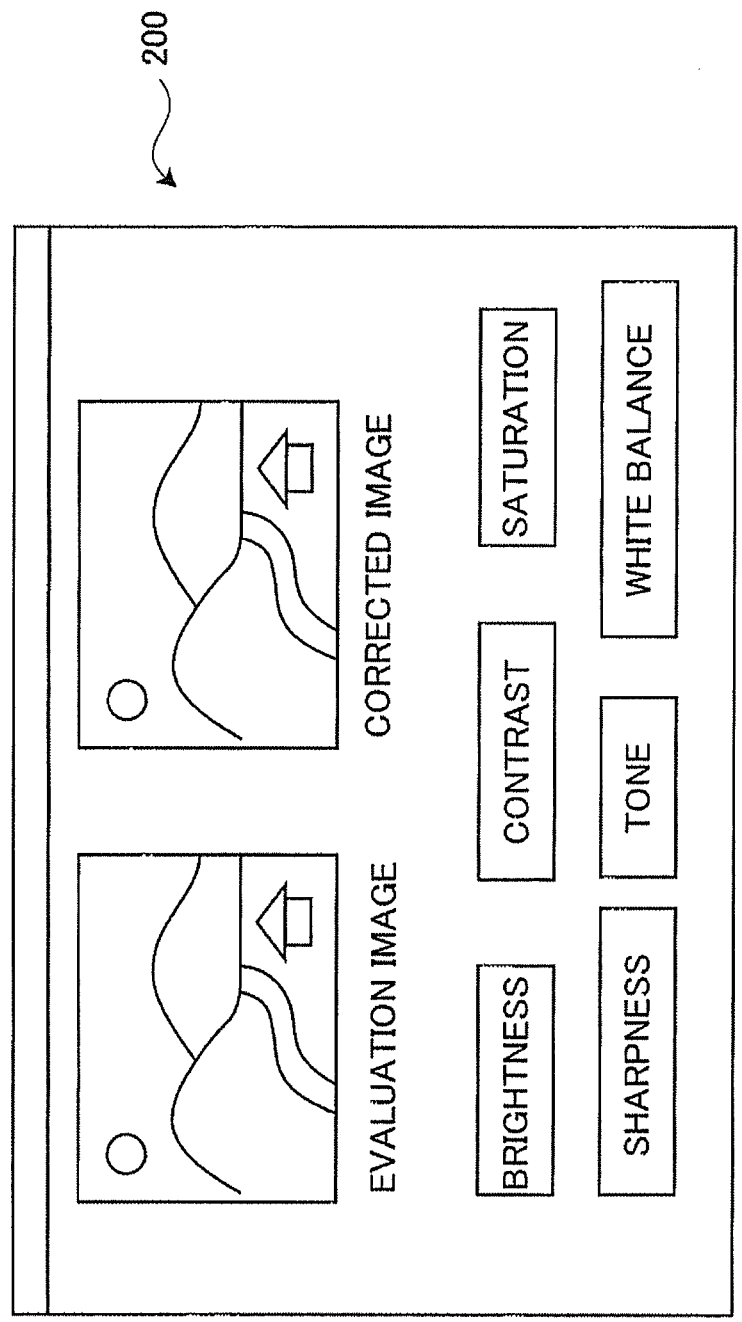
FIG. 2 is a diagram illustrating an example of a GUI of an image processing tool for correcting the image qualities of an evaluation image.

FIG. 2 shows an example of an image processing tool to correct the image qualities of the evaluation image.

The image processing tool 200 shown in FIG. 2 loads and displays the evaluation image, and also displays the first corrected image the image qualities of which have been adjusted by a user. In the example of FIG. 2, the image processing tool 200 has functions to correct basic image quality factors such as brightness, saturation, contrast, sharpness, tone, and white balance, and a GUI (Graphical User Interface) thereof. However, the tool is not limited to the above factors. Other items necessary for adjusting image qualities, such as noise suppression and correcting specific colors including a flesh color, green of trees and plants and a blue sky, can be added. The correction process of the image qualities may be the correction process disclosed in Non-Patent Document 1.

Figure 3:
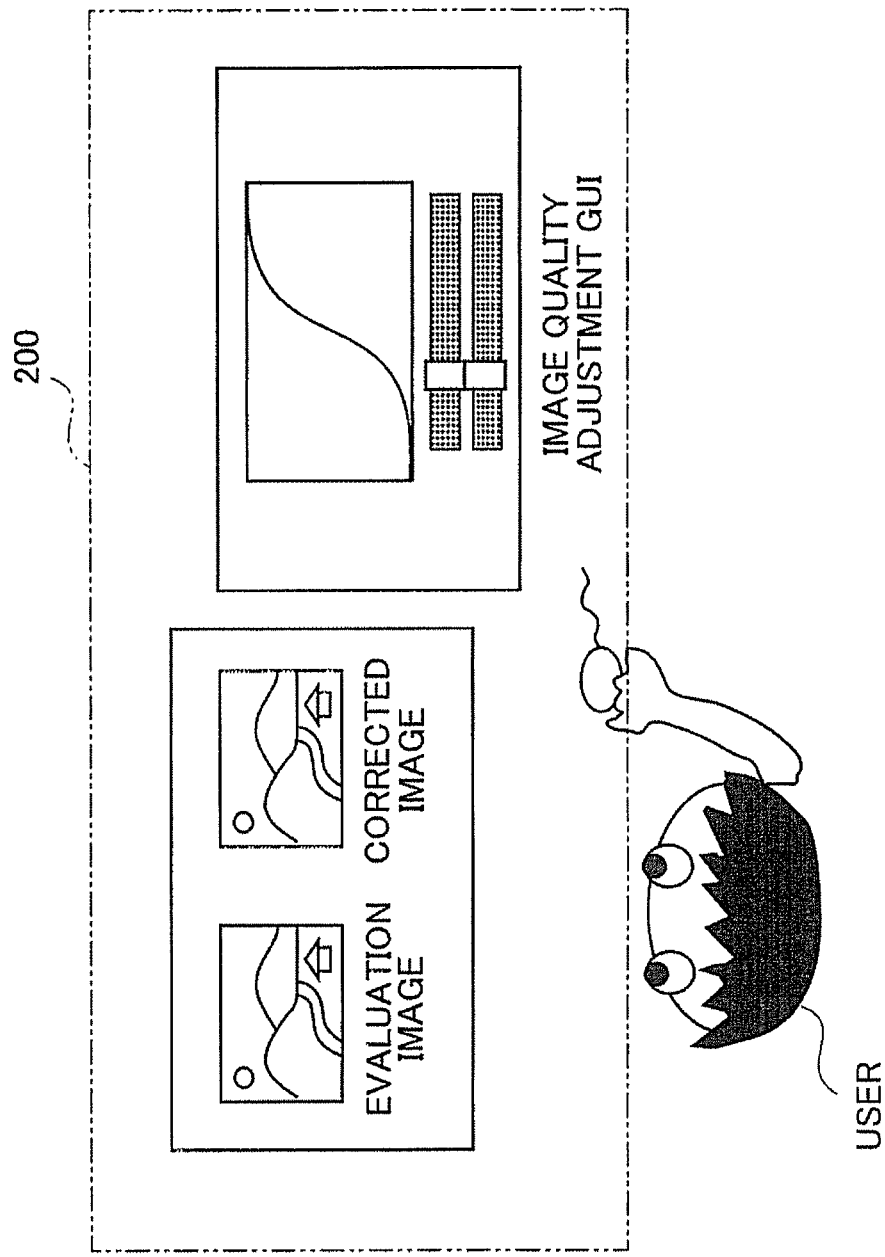
FIG. 3 is a diagram illustrating a user adjusting the image qualities of the presented evaluation image using an image quality adjustment GUI of the image processing tool.

FIG. 3 illustrates a user adjusting the image qualities of the presented evaluation image using the image quality adjustment GUI of the image processing tool 200. Incidentally, the corrected image is presented to the user at the same time after correction. The user similarly adjusts the image qualities of all the evaluation images. The adjustment of image qualities of the evaluation images is performed by many users, and many first corrected images are obtained.

The image qualities of the first corrected images produced by many users are subjectively evaluated, and experimental data are obtained for learning the image quality adjustment capabilities of users (step ST3). Each scene of the first corrected image obtained by the user's image quality adjustment is evaluated in terms of image quality in accordance with an image quality evaluation method such as a paired comparison method. For example, out of a plurality of the first corrected images, the same scenes of two corrected images are selected at random and presented to an evaluator who then chooses the one having better image qualities. The evaluation of image qualities is performed for all combinations. The evaluation experiments are conducted for a plurality of evaluators, and enough data are collected for subjective evaluation experiments. The data are necessary to learn the image quality adjustment capabilities of users.

Then, based on the results of the subjective evaluation experiments on the image qualities of the first corrected images, an image quality adjustment capability value that represents the image quality adjustment capability of a user is calculated (step ST4).

For calculation of the image quality adjustment capability values, the first corrected images are ranked according to image qualities based on the results of the subjective evaluation experiments on the image qualities of the first corrected images. For example, the results of image quality evaluation experiments of the first corrected images are arranged in a table, and calculation is performed for the first corrected images, the image qualities of which have been adjusted by users, to obtain a cumulative probability, which is the result of summing up the percentages of victories in paired comparison, or an interval scale based on Thurstone's law of comparative judgment. The magnitudes of the values represent whether the subjective image qualities of the first corrected images are good or not. Such indicators as the cumulative probability and the interval scale can be regarded as an image quality adjustment capability value representing the image qualities of the first corrected image, or the image quality adjustment capability of the user who have adjusted the image qualities of the evaluation image.

Incidentally, during calculation of the image quality adjustment capability value at step ST4, it becomes clear which image has the best image qualities for each scene. Accordingly, the first corrected image having the best image qualities can be an instructor image for the scene.

Then, the difference in image quality characteristic between the first corrected image and the instructor image is calculated, the correlation function between the image quality characteristic difference and the image quality adjustment capability value is obtained (step ST5). Here, the image quality characteristic difference includes the average of differences in RGB Euclidean distance, the average of differences in lightness (the L value of CIELAB), the average of differences in brightness (Y out of the tristimulus values XYZ), the average of color differences (Eab), and the average of differences in saturation (chroma (see below)).

$$\text{Chroma} = \sqrt{(a^*)^2 + (b^*)^2} \quad \text{[Math. 1]}$$

For example, if the image quality characteristic difference between the corrected image and the instructor image is the average of differences in RGB Euclidean distance, the image quality characteristic difference is represented as follows:

[Math. 2]

Image quality characteristics difference =

$$\left( \sum_{xy} \sqrt{ \begin{aligned} &(T_R(x, y) - C_R(x, y))^2 + \\ &(T_G(x, y) - C_G(x, y))^2 + \\ &(T_B(x, y) - C_B(x, y))^2 \end{aligned} } \right) / (x \cdot y) \quad \text{Equation (1)}$$

Here, x and y represent the coordinate position of the image, and TR, TG, and TB represent the pixel values R, G, and B of the instructor image. CR, CG, and CB represent the pixel values R, G, and B of the first corrected image. Σ means adding up the differences of RGB Euclidean distance of all the pixels of the image. Here, the image quality characteristic difference may be calculated from the entire image as described above or from a predetermined attention area. If TR, TG, TB, CR, CG, and CB are respectively replaced with L*, a*, and b* of CIELAB, the image quality characteristic difference is the average of color differences. As for the differences in saturation or lightness, the differences in saturation or lightness are similarly calculated between the first corrected image and the instructor image.

Moreover, the difference information of histograms related to such color information as contrast ratio, saturation, lightness, brightness, or hues, and the difference in the amount of edges can be used as an image quality characteristic difference. In the typical correction of contrast, a histogram is created for the brightness components of the image, several percent of candidates are removed from the upper and lower sides of the histogram as noise component, and the High value of the Highlight component of the image and the Low value of the Shadow component are extracted. For example, if the contrast of the image is Cont, the contrast Cont of the image is defined as follows:

[Math. 3]

$$\text{Cont} = \text{Hight} - \text{Low} \quad \text{Equation (2)}$$

Here, assume that the contrast ratio is Cont_Ratio, the contrast of the instructor image of a certain scene is Cont_Best, and the contrast of the corrected image X is Cont_X. In this case, as represented in the following equation, the contrast ratio Cont_Ratio can be calculated from the ratio of the contrast Cont_Best of the instructor image to the contrast Cont_X of the corrected image X.

[Math. 4]

$$\text{Cont\_Ratio} = \text{Cont\_X} / \text{Cont\_Best} \quad \text{Equation (3)}$$

Moreover, the histograms related to such color information as brightness, lightness, hues, and saturation are evaluated based on the differences in shape of the histograms. For example, assume that in a certain scene, the brightness histogram of the instructor image is Yhist_Best(i) and the brightness histogram of the first corrected image X is Yhist_X(i). Here, i represents an element of a histogram array: i may be 0 to 255 in the case of brightness. If the evaluation value of the difference between the brightness histogram Yhist_Best(i) of the instructor image and the brightness histogram Yhist_X(i) of the first corrected image X is Yhist_diff_X, the evaluation value Yhist_diff_X is defined as follows:

[Math. 5]

$$\text{Yhist\_diff\_X} = \Sigma \text{ABS}(\text{Yhist\_Best}(i) - \text{Yhist\_X}(i)) \quad \text{Equation (4)}$$

Here, ABS( ) is a function representing an absolute value. Calculation is also performed for the chroma histograms of saturation, brightness, and hues for each color attribute in a similar way to the brightness histogram.

As described above, the image quality characteristic difference includes the average of differences in RGB Euclidean distance, the average of differences in lightness (the L value of CIELAB), the average of differences in brightness (Y out of the tristimulus values XYZ), the average of color differences (Eab), the average of differences in saturation, the difference information of histograms related to such color information as contrast ratio, saturation, lightness, brightness, or hues, and the difference in the amount of edges. However, the image quality characteristic difference is not limited to these kinds of information. Various kinds of difference information between the first corrected image and the instructor image can be used.

Figure 4:
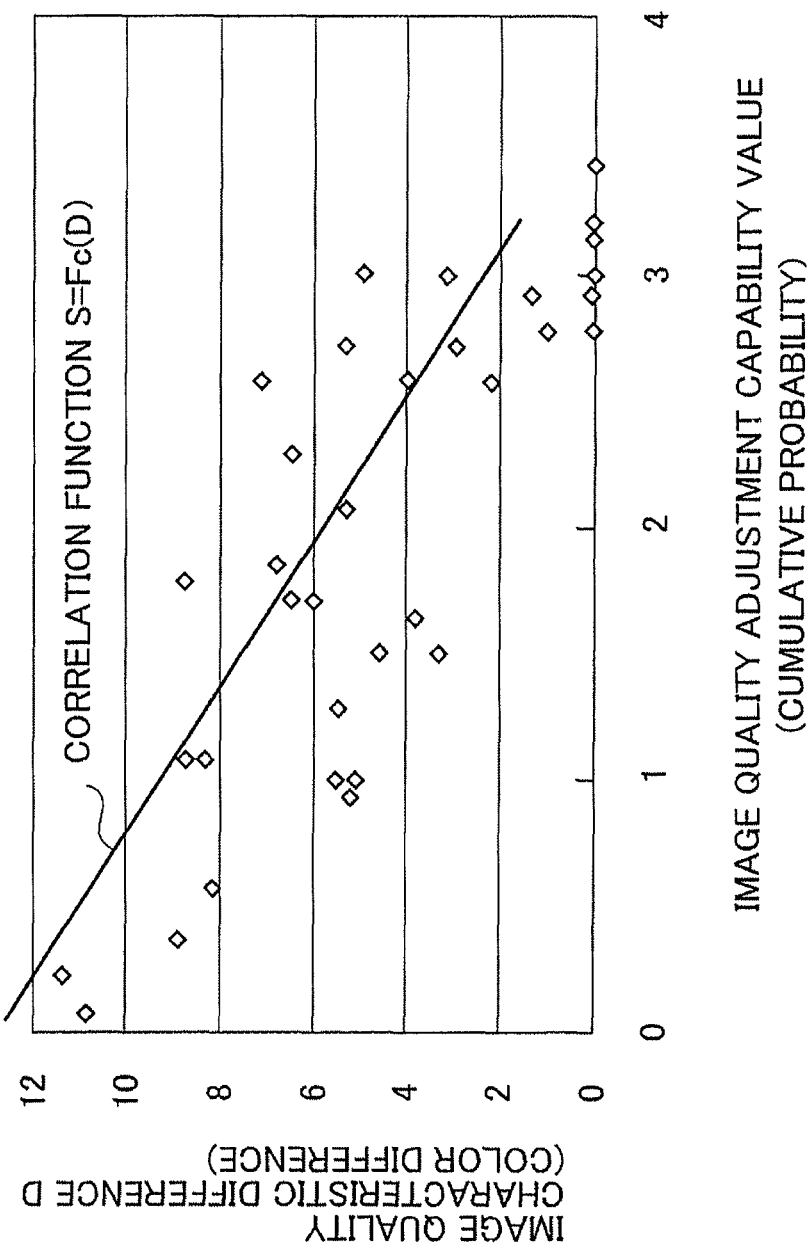
FIG. 4 is a diagram illustrating an example of relation between image quality characteristic differences and image quality adjustment capability values.

FIG. 4 is an example in which the image quality characteristic differences D (color differences) that are each given to each first corrected image and the image quality adjustment capability values S (cumulative probabilities) are plotted, with the vertical axis representing the image quality characteristic differences and the horizontal axis representing the image quality adjustment capability. It is clear from what are plotted in FIG. 4 that there is a correlation between the image quality characteristic differences D and the image quality adjustment capability values S. Therefore, the correlation function S=Fc(D) between the image quality characteristic differences D and the image quality adjustment capability values S is calculated.

Then, as illustrated in FIG. 3, a second corrected image is obtained by letting a user, whose image quality adjustment capability is to be measured, correct the image qualities of the evaluation image using an image processing tool that can control the strength of correction among the image quality items of the image (step ST6).

Then, the image quality characteristic difference D between the second corrected image and the instructor image is calculated. With the use of the image quality characteristic difference D and the correlation function (S=Fc(D)) obtained at step ST5, the image quality adjustment capability value S of the user is determined (step ST7). The image quality adjustment capability value S is output (step ST8).

Figure 5:
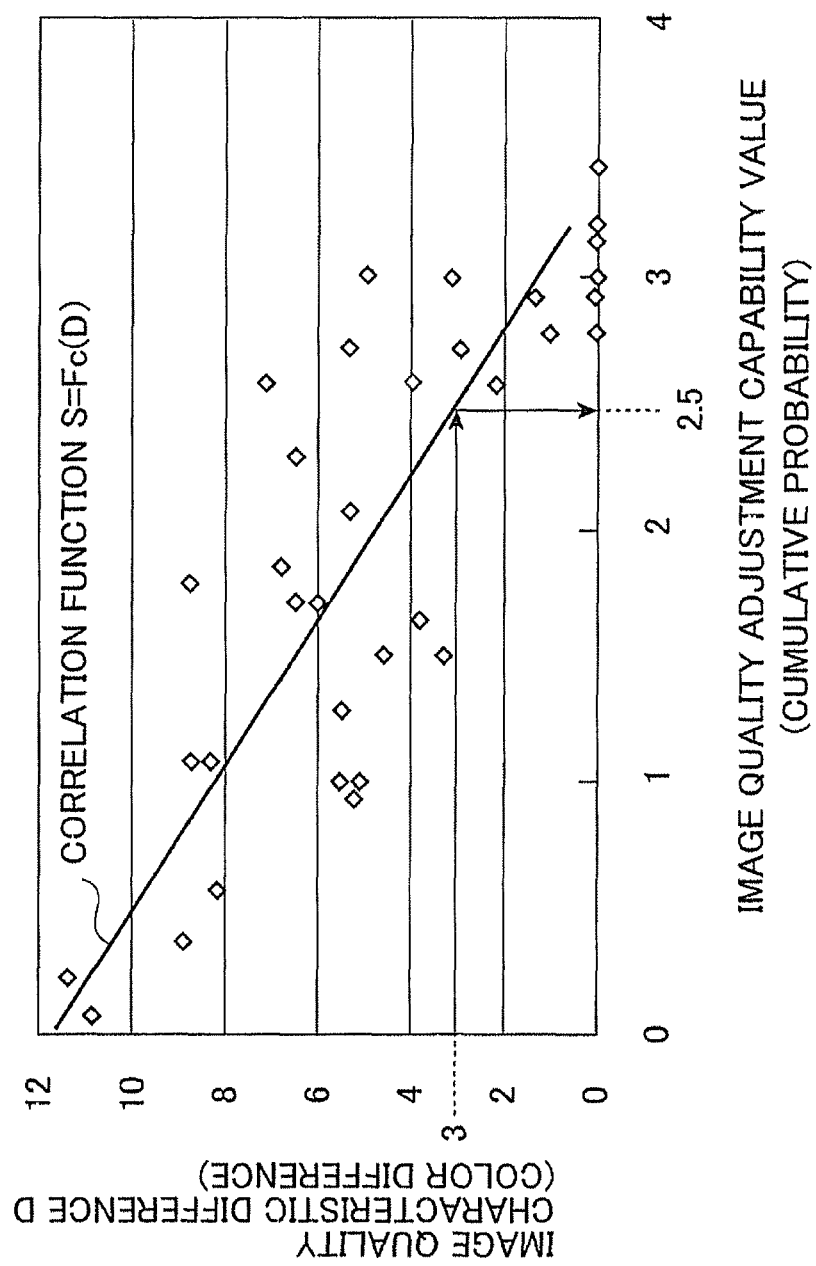
FIG. 5 is a diagram illustrating a correlation function calculated from the example of relation between image quality characteristic differences and image quality adjustment capability values.

For example, FIG. 5 is a diagram showing the correlation function S=Fc(D) calculated from the correlation between the image quality characteristic differences D and the image quality adjustment capability values S illustrated in FIG. 4. As shown in FIG. 5, if the average of the color difference, or the image quality characteristic difference D, of the second corrected image obtained after the user has adjusted the image qualities of the evaluation image of a certain scene and the instructor image of the scene is 3, the user's image quality adjustment capability value S calculated from the correlation function S=Fc(D) is about 2.5. In the case of FIG. 5, the highest value of the image quality adjustment capability value S is around 3.5. Therefore, it can be concluded that the user's image quality adjustment capability is relatively high.

Therefore, according to the present exemplary embodiment, the image quality adjustment capability of a user for color images of the color image device and the color image processing system can be measured objectively.

Incidentally, according to the present invention, the image quality adjustment capability of a user (a person) is measured. However, the present invention is not limited to this. The image quality adjustment capability of a color image system may be measured. In this case, the image quality adjustment capability of the color image system for color images of the color image device and the color image processing system can be measured objectively.

Second Exemplary Embodiment

Figure 6:
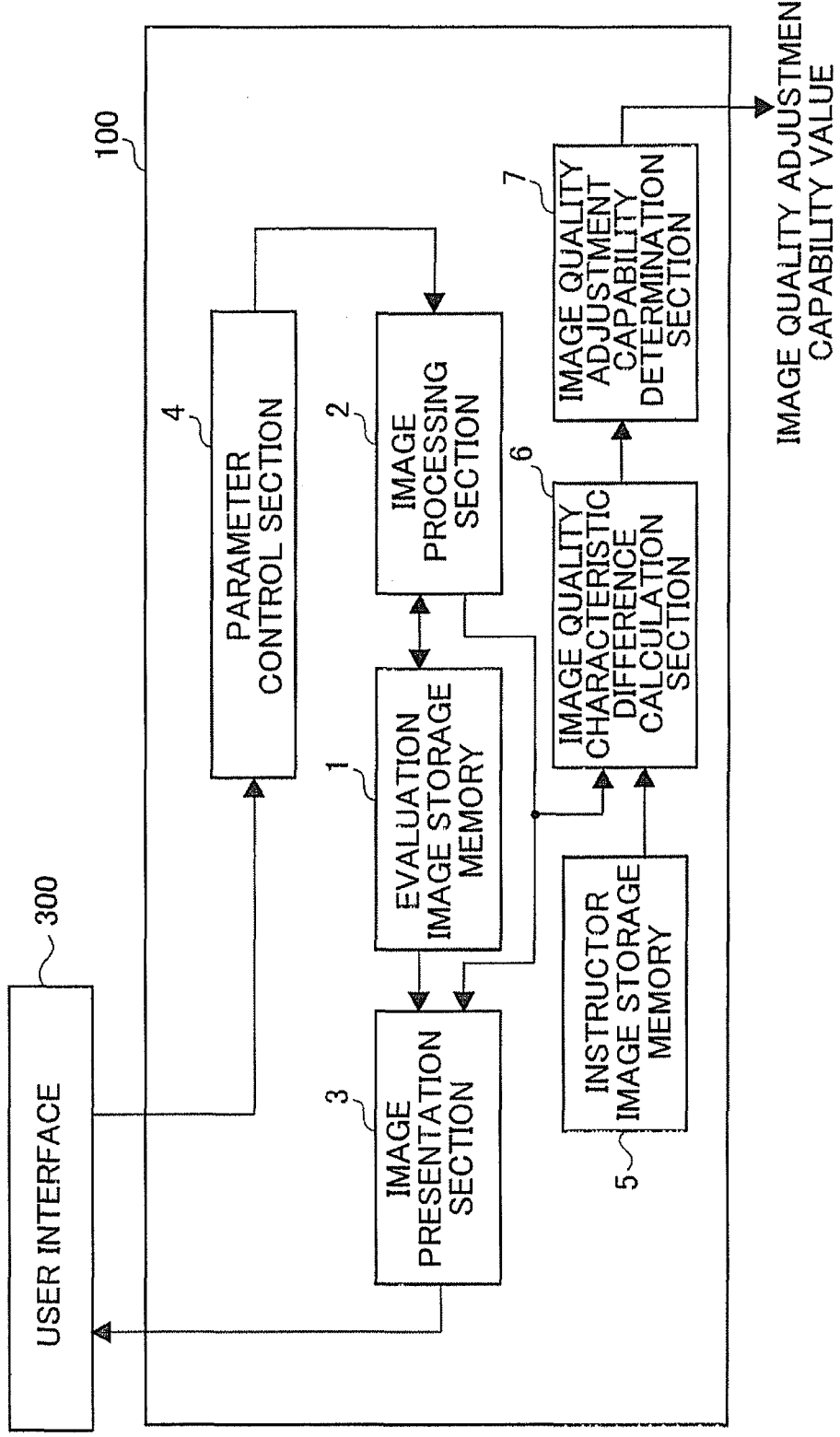
FIG. 6 is a block diagram illustrating the overall configuration of an image quality adjustment capability measurement device according to a second exemplary embodiment of the present invention.

The following describes an image quality adjustment capability measurement device 100 according to a second exemplary embodiment of the present invention, with reference to FIG. 6.

FIG. 6 is a block diagram illustrating the image quality adjustment capability measurement device 100 according to the present exemplary embodiment. The image quality adjustment capability measurement device 100 shown in the diagram uses the image quality adjustment capability measurement method of the first exemplary embodiment, and is a device that lets a user adjust the image qualities of the image through an user interface 300 such as the above-mentioned GUI of the image processing tool 200 to output the image quality adjustment capability value, which is an objective evaluation value of the image quality adjustment capability of the user.

The image quality adjustment capability measurement device 100 includes an evaluation image storage memory 1, an image processing section 2, an image presentation section 3, a parameter control section 4, an instructor image storage memory 5, an image quality characteristic difference calculation section 6, and an image quality adjustment capability determination section 7.

The evaluation image storage memory 1 stores the evaluation image. The image processing section 2 performs an image process to adjust the image qualities of the evaluation image and produces the corrected image. The image presentation section 3 presents the evaluation image and the corrected image to a user. The parameter control section 4 can control correction strength parameters of an image quality correction process which the image processing section 2 performs while the user is watching the evaluation image and the corrected image. The instructor image storage memory 5 stores the instructor image, which is a target for the evaluation image. The image quality adjustment capability determination section 7 calculates the user's image quality adjustment capability value from the image quality characteristic difference and the image quality characteristic difference calculation section 6 that calculates the image quality characteristic difference between the corrected image and the instructor image.

The image quality adjustment capability measurement device 100 can be realized by a computer. The components constituting the image quality adjustment capability measurement device 100, including the evaluation image storage memory 1, the image processing section 2, the image presentation section 3, the parameter control section 4, the instructor image storage memory 5, the image quality characteristic difference calculation section 6, and the image quality adjustment capability determination section 7, can be realized as a program that the processing unit of the computer (CPU: Central Processing Unit) executes to realize the above-mentioned functions. The components constituting the image quality adjustment capability measurement device 100 can be realized by a computer and as a program.

The following describes the operation of the image quality adjustment capability measurement device 100.

First, the image quality adjustment capability measurement device 100 stores in advance the evaluation image and the instructor image, which is a target for the evaluation image, in the evaluation image storage memory 1 and the instructor image storage memory 5, respectively.

Then, the image presentation section 3 presents the evaluation image stored in the evaluation image storage memory 1 to the user through the user interface 300 as displayed on the above-mentioned GUI of the image processing tool 200 in FIG. 2, as well as the image processing items for adjusting image qualities which have been prepared in the image processing section 2. Incidentally, before the image processing is applied, the portion for the corrected image of the GUI illustrated in FIG. 2 displays the evaluation image or nothing. The user selects the presented image processing items to adjust the image qualities of the presented evaluation image through the user interface 300.

Then, the parameter control section 4 presents the image quality adjustment GUI of the image processing tool 200, as illustrated in FIG. 3, to the user through the user interface 300, allowing the user to control the strength of the correction parameter used in the selected image process. Therefore, the correction parameter specified by the user is output from the parameter control section 4 to the image processing section 2.

Subsequently, the image processing section 2 performs the selected image process for the evaluation image stored in the evaluation image storage memory 1 using the correction parameter which the user has specified through the parameter control section 4 to produce the corrected image, and outputs the corrected image to the image presentation section 3 to present the corrected image to the user through the user interface 300. The image processing section 2 also outputs the corrected image to the image quality characteristic difference calculation section 6.

Then, using, for example, the method of the equation (1) or the like, the image quality characteristic difference calculation section 6 calculates the image quality characteristic difference D between the instructor image corresponding to the evaluation image stored in advance in the instructor image storage memory 5 and the corrected image output by the image processing section 2 in accordance with step ST4 in the above-described image quality adjustment capability measurement method, and then outputs the image quality characteristic difference D to the image quality adjustment capability determination section 7.

Subsequently, using the correlation function S=FC(D) between the image quality characteristic difference D and the image quality adjustment capability value S prepared in advance in accordance with step ST5 in the image quality adjustment capability measurement method of the first exemplary embodiment, the image quality adjustment capability determination section 7 calculates the image quality adjustment capability value S for the image quality characteristic difference D supplied from the image quality characteristic difference calculation section 6, and then outputs an image quality adjustment capability value as the user's image quality adjustment capability value.

Therefore, according to the present exemplary embodiment, like the first exemplary embodiment, the image quality adjustment capability of a user for color images of the color image device and the color image processing system can be measured objectively.

Incidentally, according to the present invention, the image quality adjustment capability of a user (a person) is measured. However, the present invention is not limited to this. The image quality adjustment capability of a color image system may be measured. In this case, the image quality adjustment capability of the color image system for color images of the color image device and the color image processing system can be measured objectively.

Third Exemplary Embodiment

Figure 7:
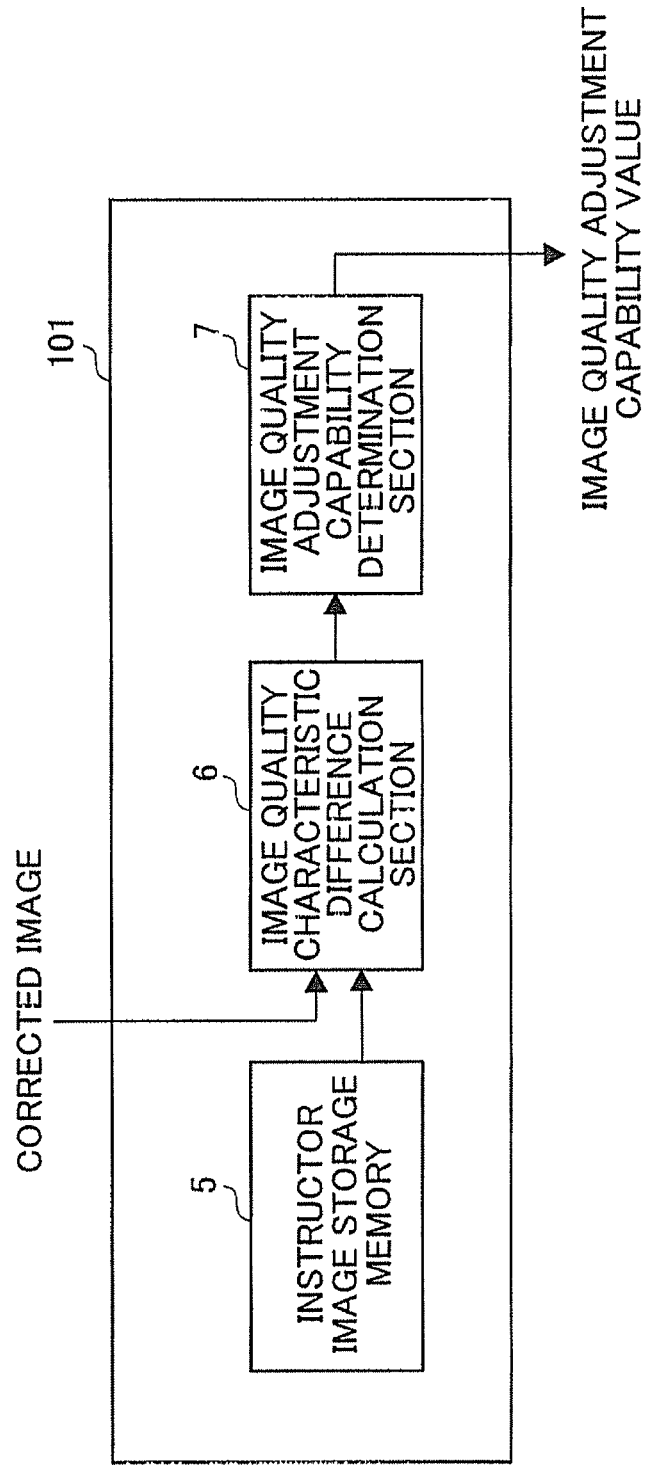
FIG. 7 is a flowchart illustrating the operation of an image quality adjustment capability measurement device according to a third exemplary embodiment of the present invention.

The following describes an image quality adjustment capability measurement device 101 according to a third exemplary embodiment of the present invention, with reference to FIG. 7.

FIG. 7 is a block diagram illustrating the image quality adjustment capability measurement device 101 according to the present exemplary embodiment. The image quality adjustment capability measurement device 101 shown in the diagram includes an instructor image storage memory 5, which stores the instructor image, a target for the evaluation image; an image quality characteristic difference calculation section 6, which calculates the image quality characteristic difference between the corrected image and the instructor image; and an image quality adjustment capability determination section 7, which calculates the user's image quality adjustment capability value from the calculated image quality characteristic difference.

That is, according to the present exemplary embodiment, the evaluation image storage memory 1, the image processing section 2, the image presentation section 3, and the parameter control section 4 are omitted from the above-described image quality adjustment capability measurement device 100 shown in FIG. 6.

The image quality adjustment capability measurement device 101 loads the corrected image which is obtained after the user corrects the image qualities of the evaluation image, and outputs the user's image quality adjustment capability value. The operation of each section constituting the image quality adjustment capability measurement device 101 is the same as that of each section of the image quality adjustment capability measurement device 100.

The image quality adjustment capability measurement device 101 can be realized by a computer. The components constituting the image quality adjustment capability measurement device 101, including the instructor image storage memory 5, the image quality characteristic difference calculation section 6, and the image quality adjustment capability determination section 7, can be realized as a program that the processing unit of the computer (CPU) executes to realize the above-mentioned functions. The components constituting the image quality adjustment capability measurement device 101 can be realized by a computer and as a program.

Therefore, according to the present exemplary embodiment, like the second exemplary embodiment, the image quality adjustment capability of a user for color images of the color image device and the color image processing system can be measured objectively.

Incidentally, according to the present invention, the image quality adjustment capability of a user (a person) is measured. However, the present invention is not limited to this. The image quality adjustment capability of a color image system may be measured. In this case, the image quality adjustment capability of the color image system for color images of the color image device and the color image processing system can be measured objectively.

Fourth Exemplary Embodiment

Figure 8:
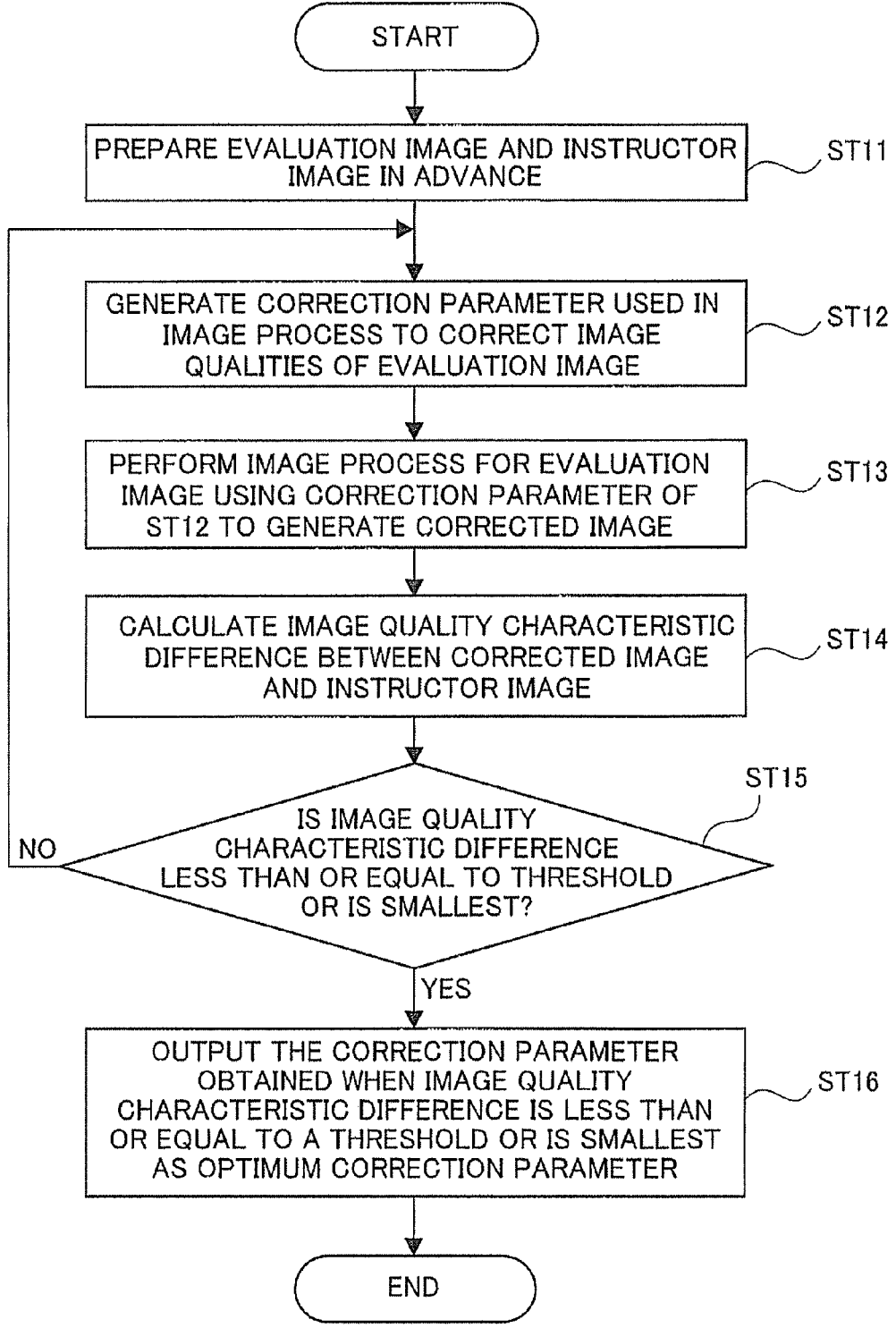
FIG. 8 is a flowchart illustrating the operation of an image quality adjustment method according to a fourth exemplary embodiment of the present invention.

The following describes an image quality adjustment method according to a fourth exemplary embodiment of the present invention, with reference to FIG. 8. The image quality adjustment capability measurement method of the first exemplary embodiment is applied to the image quality adjustment method, which is a method to automatically produce the optimum correction parameters (target correction parameters) used to adjust the image qualities of the color image device or color image system to the desired image qualities which a person subjectively perceives.

In FIG. 8, like the image quality adjustment capability measurement method of the first exemplary embodiment, the evaluation image and the instructor image, which is a target for the evaluation image and has a good image quality, are prepared in advance (step ST11).

Then, correction parameters that are to be used in an image process to correct the image qualities of the evaluation image is generated (step ST12). Here, a function for the image process of the evaluation image I is represented as P(I, a, b). In this case, a and b are parameters to control the strength of the image process, and are real numbers. At step ST12, numbers are selected from a group of numbers which can be a and b, and the selected numbers are regarded as correction parameters.

Subsequently, the corrected image of the evaluation image I is generated with the image process function P (I, a, b) using the correction parameters a and b generated at step ST12. (step ST13). Then, with the use of, for example, the above-mentioned method of the equation (1) or the like, the image quality characteristic difference D between the corrected image and the instructor image is calculated in accordance with step ST4 in the image quality adjustment capability measurement method of the first exemplary embodiment (step ST14).

Subsequently, a determination is made as to whether the calculated image quality characteristic difference D is less than or equal to a threshold or whether the calculated image quality characteristic difference D is a minimum value (step ST15). When the result is NO, the processes of step ST12 to step ST14 are repeated. On the other hand, when the result is YES, the correction parameters obtained when the image quality characteristic difference D is less than or equal to the threshold or is a minimum value is output as the optimum correction parameters which are target correction parameters by which the desired image qualities can be achieved (step ST16).

In that manner, according to the present exemplary embodiment, the evaluation images and the corresponding instructor images are provided, and the correlation function between the differences in the amount of image quality characteristic of the images and the people's image quality adjustment capability values is calculated. Then, in order to obtain the desired image qualities of an arbitrarily input image, the difference value between the amount of image quality characteristic of the corrected image, which is obtained after the image process of the input image, and the amount of image quality characteristic of the instructor image is calculated. Subsequently, with the use of the correlation function between the differences in the amount of image quality characteristic and the people's image quality adjustment capability values, the target correction parameters are determined to obtain the desired image qualities. Then, the image process is applied to the input image.

Therefore, according to the present exemplary embodiment, the image qualities set in the color image device and the color image processing system can be automatically adjusted to the desired image qualities which a person subjectively perceives.

Fifth Exemplary Embodiment

Figure 9:
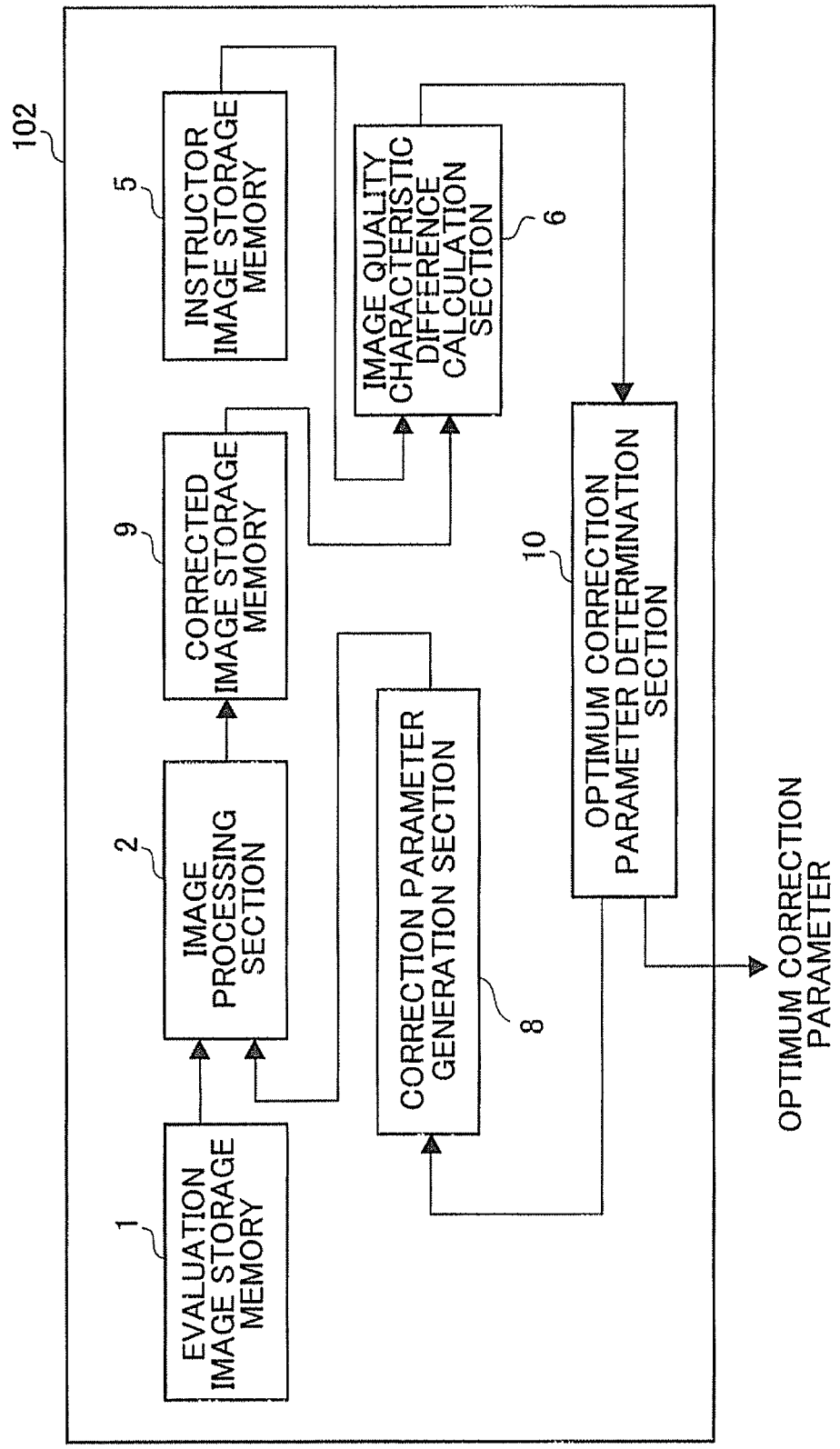
FIG. 9 is a block diagram illustrating the overall configuration of an image quality adjustment device according to a fifth exemplary embodiment of the present invention.

The following describes an image quality adjustment device 102 according to a fifth exemplary embodiment of the present invention, with reference to FIG. 9.

FIG. 9 is a block diagram illustrating the image quality adjustment device 102 according to the present exemplary embodiment. The image quality adjustment device 102 shown in the diagram uses the image quality adjustment method of the fourth exemplary embodiment, and is a device to automatically produce the optimum correction parameters used to adjust the image qualities of color images or the color image system to the desired image qualities that a person subjectively perceives.

The image quality adjustment device 102 includes an evaluation image storage memory 1, an image processing section 2, a correction parameter generation section 8, a corrected image storage memory 9, an instructor image storage memory 5, an image quality characteristic difference calculation section 6, and an optimum correction parameter determination section 10, which is a target correction parameter determination section.

The evaluation image storage memory 1 stores the evaluation image. The image processing section 2 performs an image process to adjust the image qualities of the evaluation image and produces the corrected image. The correction parameter generation section 8 generates the correction parameters used in the image process of the image processing section 2. The corrected image storage memory 9 stores the corrected image. The instructor image storage memory 5 stores the instructor image, which is a target for the evaluation image. The image quality characteristic difference calculation section 6 calculates the image quality characteristic difference D between the corrected image and the instructor image. The optimum correction parameter determination section 10 runs the correction parameter generation section 8 until the image quality characteristic difference D becomes a minimum value or less than or equal to a threshold, and outputs the correction parameters, which are obtained when the image quality characteristic difference D is a minimum value or is less than or equal to the threshold, as the optimum correction parameters which are target correction parameters by which the desired image qualities can be achieved.

The image quality adjustment device 102 can be realized by a computer. The components constituting the image quality adjustment device 102, including the evaluation image storage memory 1, the image processing section 2, the correction parameter generation section 8, the corrected image storage memory 9, the instructor image storage memory 5, the image quality characteristic difference calculation section 6, and the optimum correction parameter determination section 10, can be realized as a program that the processing unit of the computer (CPU) executes to realize the above-mentioned functions. The components constituting the image quality adjustment device 102 can be realized by a computer and as a program.

The following describes the operation of the image quality adjustment device 102.

First, the image quality adjustment device 102 stores in advance the evaluation image and the instructor image, which is a target for the evaluation image, in the evaluation image storage memory 1 and the instructor image storage memory 5, respectively.

Then, the correction parameter generation section 8 generates the correction parameters used in the image process to correct the image qualities of the evaluation image.

Subsequently, the image processing section 2 performs the image process for the evaluation image using the correction parameters generated by the correction parameter generation section 8 to produce the corrected image, and stores the corrected image in the corrected image storage memory 9.

Then, using, for example, the above-mentioned method of the equation (1) or the like, the image quality characteristic difference calculation section 6 calculates the image quality characteristic difference D between the corrected image stored in the corrected image storage memory 9 and the corresponding instructor image stored in the instructor image storage memory 5 in accordance with step ST4 in the image quality adjustment capability measurement method of the first exemplary embodiment.

Subsequently, the optimum correction parameter determination section 10 runs the correction parameter generation section 8 until the image quality characteristic difference D becomes less than or equal to the threshold or a minimum value. When the image quality characteristic difference D becomes less than or equal to the threshold or a minimum value, the optimum correction parameter determination section 10 outputs the correction parameters obtained at that time as the optimum correction parameter.

In that manner, even in the present exemplary embodiment, like the fifth exemplary embodiment, the evaluation images and the corresponding instructor images are provided, and the correlation function between the differences in the amount of image quality characteristic of the images and the people's image quality adjustment capability values is calculated. Then, in order to obtain the desired image qualities of an arbitrarily input image, the difference value between the amount of image quality characteristic of the corrected image, which is obtained after the image process of the input image, and the amount of image quality characteristic of the instructor image is calculated. Subsequently, with the use of the correlation function between the differences in the amount of image quality characteristic and the people's image quality adjustment capability values, the correction parameters are determined to obtain the desired image qualities. Then, the image process is applied to the input image.

Therefore, according to the present exemplary embodiment, the image qualities set in the color image device and the color image processing system can be automatically adjusted to the desired image qualities which a person subjectively perceives.

Incidentally, the image quality adjustment device 102 may not be equipped with the corrected image storage memory 9: The corrected image generated by the image processing section 2 may be directly input into the image quality characteristic difference calculation section 6.

Moreover, the image quality adjustment device 102 can be applied to an image and image quality adjustment device which adjusts the image qualities of an arbitrarily input image using the image processing section 2 and the optimum correction parameters which are output from the image quality adjustment device 102.

Sixth Exemplary Embodiment

Figure 10:
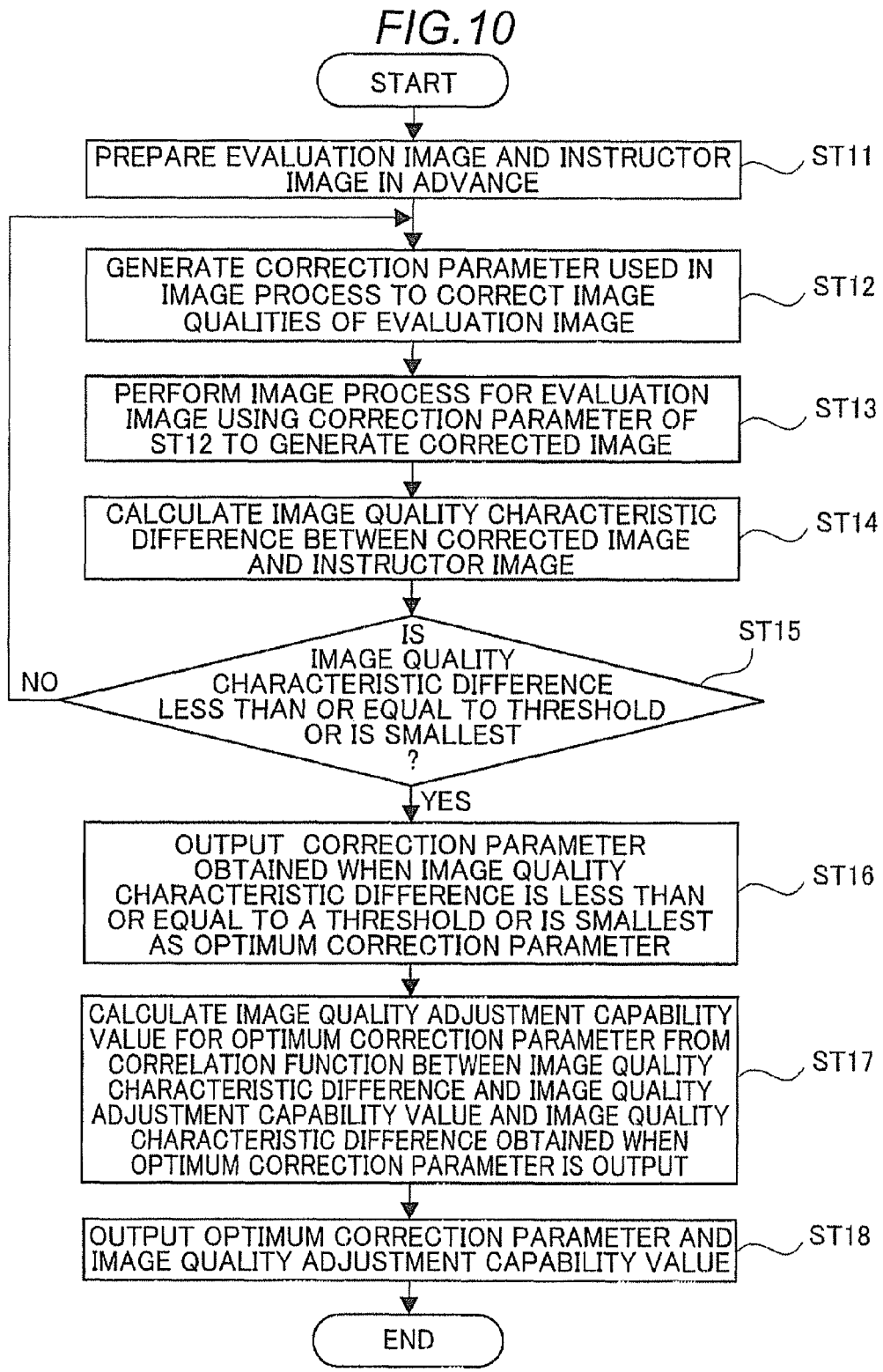
FIG. 10 is a flowchart illustrating the operation of an image quality adjustment method according to a sixth exemplary embodiment of the present invention.

The following describes an image quality adjustment method according to a sixth exemplary embodiment of the present invention, with reference to FIG. 10.

According to the image quality adjustment method of the present exemplary embodiment, the following processes (steps ST17 and ST18) are added to the image quality adjustment method of the fourth exemplary embodiment: calculating the image quality adjustment capability value S for the image quality characteristic difference D obtained when the optimum correction parameters are output at step ST16, with the use of the correlation function (S=Fc(D)) between the image quality characteristic differences D and the image quality adjustment capability values S obtained at step ST7 in the image quality adjustment capability measurement method of the first exemplary embodiment, and outputting the image quality adjustment capability value S.

Therefore, according to the present exemplary embodiment, the optimum correction parameters are automatically produced to adjust the image qualities of the color image device or color image system to the desired image qualities that a person subjectively perceives. In addition, the image quality adjustment capability value, or the performance in image qualities when the optimum correction parameters are applied, can be presented.

Seventh Exemplary Embodiment

Figure 11:
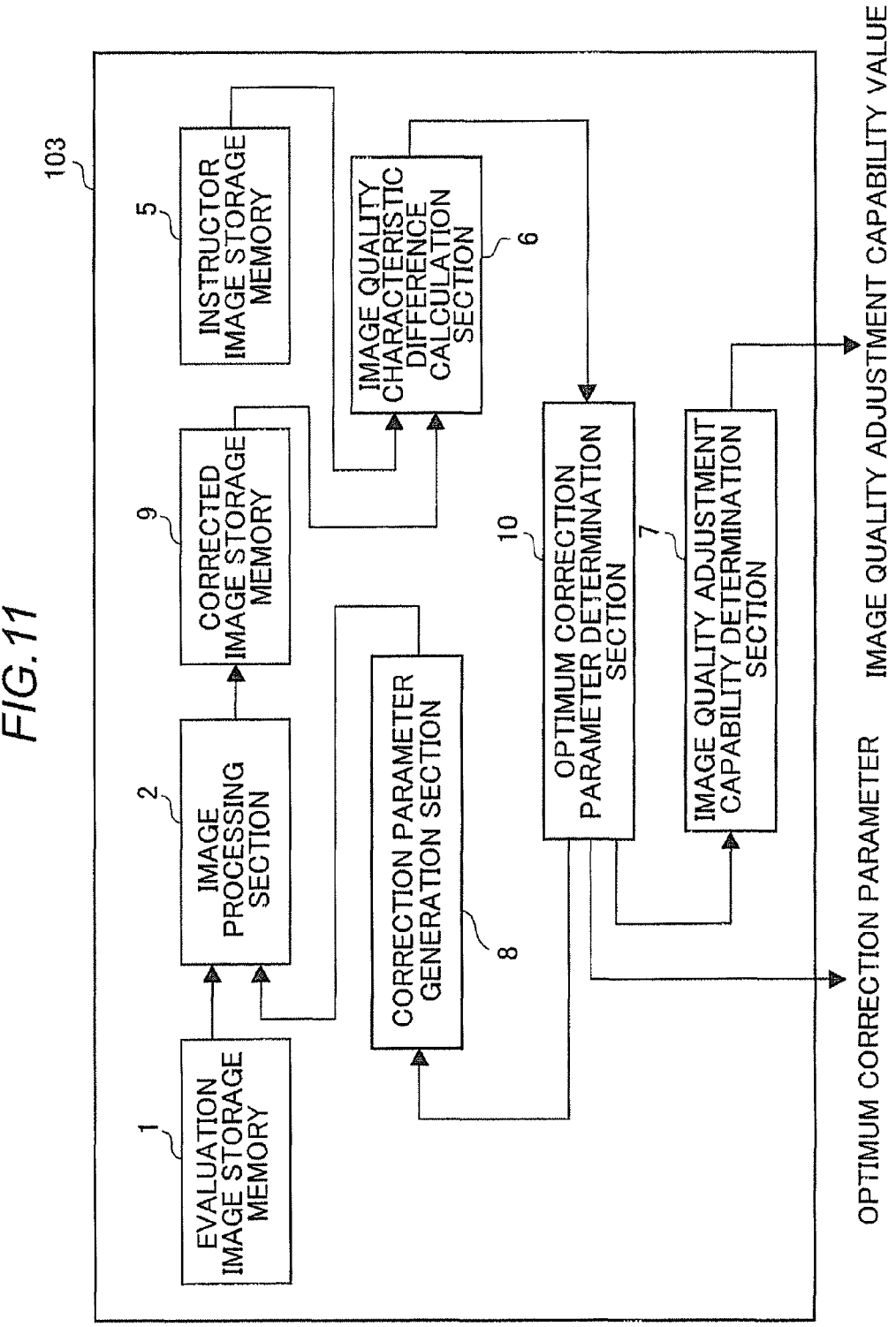
FIG. 11 is a block diagram illustrating the overall configuration of an image quality adjustment device according to a seventh exemplary embodiment of the present invention.

The following describes an image quality adjustment device 103 according to a seventh exemplary embodiment of the present invention, with reference to FIG. 11.

FIG. 11 is a block diagram illustrating the image quality adjustment device 103 according to the present exemplary embodiment. The image quality adjustment device 103 has the configuration of the image quality adjustment device 102 to which the image quality adjustment capability determination section 7 of the image quality adjustment capability measurement device 100 is added.

The image quality adjustment device 103 can be realized by a computer. The components constituting the image quality adjustment device 103, including the evaluation image storage memory 1, the image processing section 2, the correction parameter generation section 8, the corrected image storage memory 9, the instructor image storage memory 5, the image quality characteristic difference calculation section 6, the optimum correction parameter determination section 10, and the image quality adjustment capability determination section 7, can be realized as a program that the processing unit of the computer (CPU) executes to realize the above-mentioned functions. The components constituting the image quality adjustment device 103 can be realized by a computer and as a program.

The following describes the operation of the image quality adjustment device 103. Here, the difference between the image quality adjustment device 103 and the image quality adjustment device 102 is described.

In the image quality adjustment device 103, after the optimum correction parameter determination section 10 determines the optimum correction parameters, the image quality adjustment capability determination section 7 calculates the image quality adjustment capability value using the image quality characteristic difference, which is obtained when the optimum correction parameters are calculated, and the correlation function between the image quality characteristic differences and the image quality adjustment capability values.

Therefore, even in the present exemplary embodiment, like the sixth exemplary embodiment, the optimum correction parameters are automatically produced to adjust the image qualities of the color image device or color image system to the desired image qualities that a person subjectively perceives. In addition, the image quality adjustment capability value, or the performance in image qualities when the optimum correction parameters are applied, can be presented.

Incidentally, the image quality adjustment device 103 may not be equipped with the corrected image storage memory 9: The corrected image generated by the image processing section 2 may be directly input into the image quality characteristic difference calculation section 6.

Moreover, the image quality adjustment device 103 can be applied to an image and image quality adjustment device which adjusts the image qualities of an arbitrarily input image using the image processing section 2 and the optimum correction parameters which are output from the image quality adjustment device 103.

Eighth Exemplary Embodiment

Figure 12:
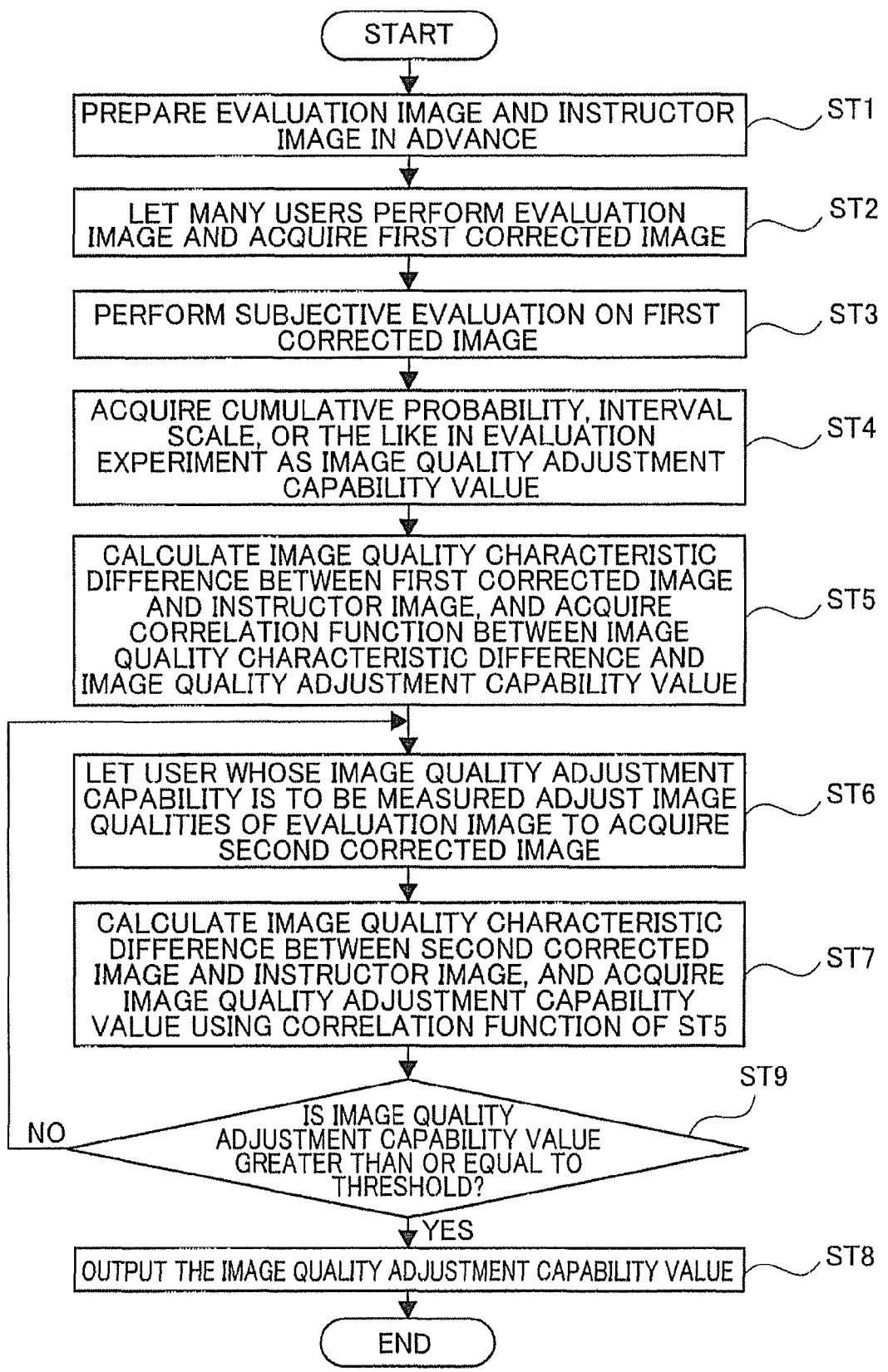
FIG. 12 is a flowchart illustrating the operation of an image quality adjustment capability training method according to an eighth exemplary embodiment of the present invention.

The following describes an image quality adjustment capability training method according to an eighth exemplary embodiment of the present invention, with reference to FIG. 12.

According to the present exemplary embodiment, the image quality adjustment capability training method contains the processes of steps ST1 to ST8 (see FIG. 1) of the image quality adjustment capability measurement method of the first exemplary embodiment, and the following process (step ST9) between steps ST7 and ST8: Controlling the user's operation of adjusting the image qualities (step ST6) in accordance with the image quality adjustment capability value obtained at step ST7.

According to the method, after the processes of step ST1 to ST7 are performed in a similar way to the first exemplary embodiment, the user's image quality adjustment capability value obtained at step ST7 is compared with a preset threshold (step ST9). As a result, when the user's image quality adjustment capability value is, for example, less than the threshold (NO), the process of step ST6 is retried to prompt the user to continue the image quality adjustment operation. When the image quality adjustment capability value is greater than the threshold (YES), the user is encouraged to end the image quality adjustment operation, and control is performed at the subsequent step SP8 to output the image quality adjustment capability value obtained at that time.

Therefore, according to the present exemplary embodiment, the person's image quality adjustment capability, the capability to subjectively improve the image qualities of the color image device or color image system, can be improved.

Ninth Exemplary Embodiment

Figure 13:
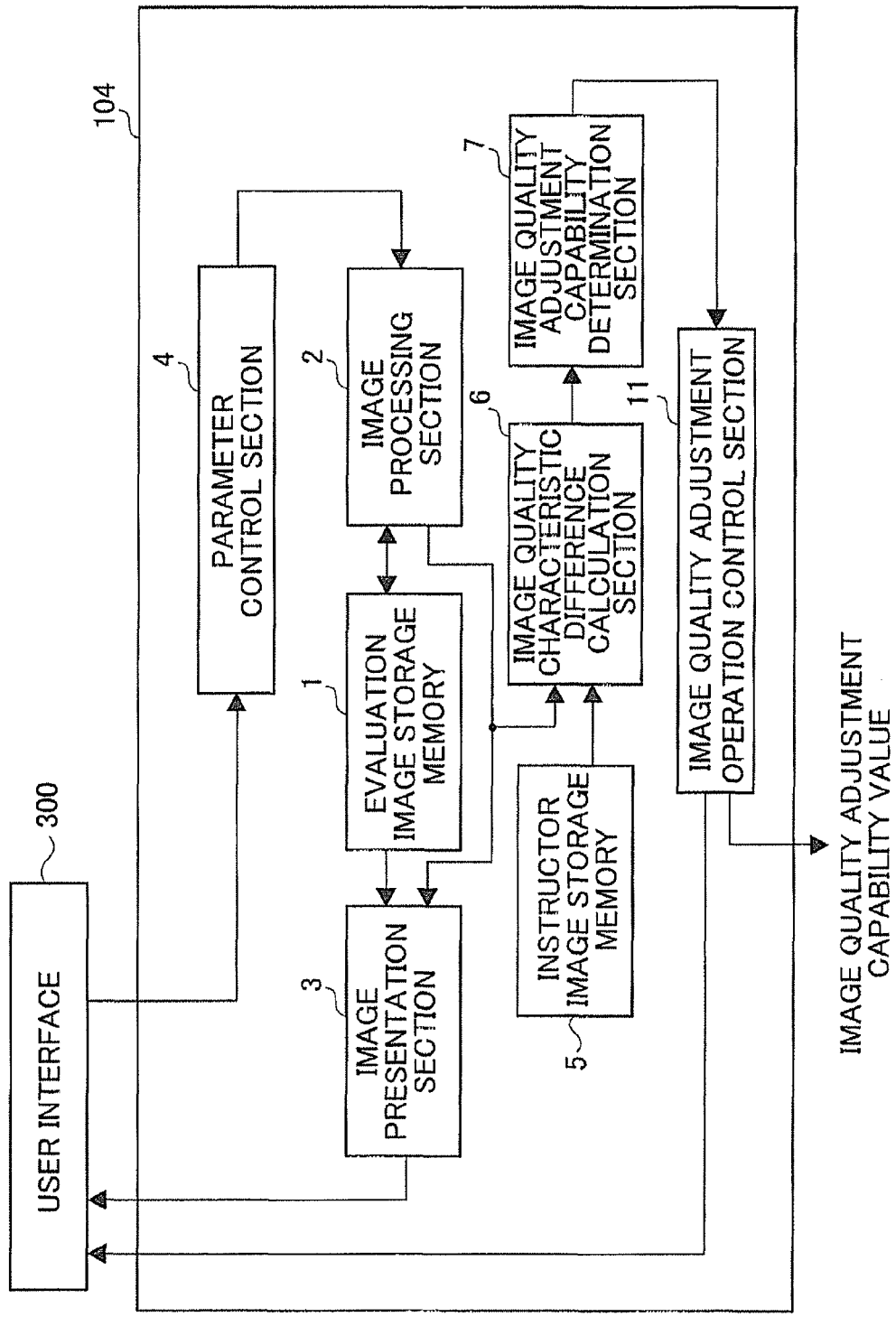
FIG. 13 is a block diagram illustrating the overall configuration of an image quality adjustment capability training device according to a ninth exemplary embodiment of the present invention.

The following describes an image quality adjustment capability training device 104 according to a ninth exemplary embodiment of the present invention, with reference to FIG. 13.

According to the present exemplary embodiment, the image quality adjustment capability training device 104 shown in FIG. 13 uses the image quality adjustment capability training method of the eighth exemplary embodiment, and has the configuration of the image quality adjustment capability measurement device 100 of the second exemplary embodiment (FIG. 6) to which an image quality adjustment operation control section 11 is added.

The image quality adjustment capability training device 104 can be realized by a computer. The components constituting the image quality adjustment capability training device 104, including the evaluation image storage memory 1, the image processing section 2, the image presentation section 3, the parameter control section 4, the instructor image storage memory 5, the image quality characteristic difference calculation section 6, the image quality adjustment capability determination section 7, and the image quality adjustment operation control section 11, can be realized as a program that the processing unit of the computer (CPU) executes to realize the above-mentioned functions. The components constituting the image quality adjustment capability training device 104 can be realized by a computer and as a program.

The following describes the operation of the image quality adjustment capability training device 104. Here, the difference between the image quality adjustment capability training device 104 and the image quality adjustment capability measurement device 100 is described.

In the image quality adjustment capability training device 104, after the image quality adjustment capability determination section 7 determines the user's image quality adjustment capability value, the image quality adjustment operation control section 11 makes a determination as to whether to allow the user to continue the image quality adjustment operation or force the user to end the image quality adjustment operation in accordance with the image quality adjustment capability value.

For example, when the user's image quality adjustment capability value determined by the image quality adjustment capability determination section 7 is less than a threshold, the image quality adjustment operation control section 11 prompts the user to continue the image quality adjustment operation.

Then, when the image quality adjustment capability value exceeds the threshold, the image quality adjustment operation control section 11 forces the user to end the image quality adjustment operation, and then outputs the image quality adjustment capability value obtained at that time.

Therefore, even in the present exemplary embodiment, like the eighth exemplary embodiment, the person's image quality adjustment capability, the capability to subjectively improve the image qualities of the color image device or color image system, can be improved.

Incidentally, if each process (function) of the above-mentioned components can be realized, each device of the above-mentioned exemplary embodiments is not limited to a specific one in terms of physical configuration of the device, and hardware and software structures inside the device. For example, each of the following structures is applicable: a structure in which individual circuits, units, or program components like program modules are independently formed for each component; a structure in which a plurality of components is put together into one circuit or unit. Depending on limitations of the function, usage or the like of the actually used device, the above structures may be subjected to selection, change, modification, or the like. Moreover, the operation method of a device that performs similar processes to those of each function of the above-mentioned components is also within the scope of the present invention.

Moreover, at least part of each function of the above-mentioned components may be realized by software processing by a computer consisting of a processing device such as a microprocessor including a CPU. In this case, the program that causes the computer to function is within the scope of the present invention. The program is not limited to those that the CPU can directly execute. The program includes source programs, compressed programs, encrypted programs, and other kinds of programs. Moreover, the program can be provided in any of the following forms: a program that operates in conjunction with a control program such as OS (Operating System), which takes overall control of the device, and firmware; an application program incorporated in part of the control program to operate integrally; software components (software modules) and the like constituting the control program.

Furthermore, if the program is applied to a device having a communication function to communicate with an external device via a wireless or wired line, the program can be downloaded for example from an external node, such as server, connected to the line and installed in a recording medium inside the device before being used. Depending on the function, usage or the like of the actually used device, the above structures may be subjected to selection, change, modification, or the like.

Furthermore, a computer-readable recording medium on which the above-mentioned program is recorded is within the scope of the present invention. In this case, each of the following recording media is applicable: a stationary recording medium, which is fixed in the device for use; a portable recording medium that a user can carry.

The above has described the present invention with reference to the above exemplary embodiments. However, the present invention is not limited to the above exemplary embodiments. It should be understood by those skilled in the art that various modifications may occur in the configuration or details of the present invention insofar as they are within the scope of the present invention.

The present application claims priority from Japanese Patent Application No. 2007-115611 filed on Apr. 25, 2007, the entire contents of which being incorporated herein by reference.

INDUSTRIAL APPLICABILITY

The present invention can be applied to a function which measures the image quality adjustment capability of a person or color image system adjusting the image qualities of the color image device or color image processing system. Moreover, the present invention can be applied to a function which adjusts the image qualities of the color image device or color image processing system to the desired image qualities which a person subjectively perceives. Furthermore, if the present invention is in the form of programs running on a computer system, the present invention can be applied to an arbitrary color image device or color image processing system as image quality measurement software, image quality measurement utility, image quality adjustment software, or image quality adjustment utility.

The invention claimed is:

1. A method of measuring capability of a user to adjust image quality using a device for measurement of the capability, the method comprising:
    inputting, into the device, information about an instructor image serving as a target for image qualities of an evaluation image to be corrected for measurement;
    inputting, into the device, information about a correlation function obtained by
    a plurality of other users generating first corrected images by adjusting the image qualities of the evaluation image,
    calculating, by subjective evaluation of image qualities of the first corrected images, image quality adjustment capability values that represent capability of the other users to adjust the image qualities of the evaluation image,
    calculating differences in image quality characteristic between the first corrected images and the instructor image, and
    obtaining the correlation function between the image quality characteristic differences and the image quality adjustment capability values;

inputting, into the device, information about a second corrected image obtained by a user correcting the image qualities of the evaluation image;

calculating an image quality characteristic difference between the second corrected image and the instructor image; and calculating an image quality adjustment capability value of the user based on the correlation function and the image quality characteristic difference, wherein the image quality adjustment capability value is an interval scale based on Thurstone's law of comparative judgment or a cumulative probability which is the result of summing up the percentages of victories in paired comparison, and the image quality characteristic difference between the first or second corrected image and the instructor image is one selected from a group comprising: an average of differences in RGB Euclidean distance; an average of differences in lightness (L value of CIELAB); an average of differences in brightness (Y out of tristimulus values XYZ); an average of color differences (Eab); an average of differences in saturation; a difference information of histograms related to such color information as contrast ratio, saturation, lightness, brightness, or hues; and a difference in amount of edges.

2. A device for measuring capability of a user to adjust image quality, the device comprising:

an instructor image storage memory that stores an instructor image serving as a target for image qualities of an evaluation image to be corrected for measurement;

a section that uses a given correlation function obtained by a plurality of other users generating first corrected images by adjusting the image qualities of the evaluation image, calculating, by subjective evaluation of image qualities of the first corrected images, image quality adjustment capability values that represent capability of the other users to adjust the image qualities of the evaluation image, calculating differences in image quality characteristic between the first corrected images and the instructor image, and obtaining the correlation function between the image quality characteristic differences and the image quality adjustment capability values;

a corrected image input section that inputs a second corrected image obtained after the image qualities of an evaluation image are adjusted by the object;

an image quality characteristic difference calculation section that calculates the image quality characteristic difference between the second corrected image and the instructor image; and an image quality adjustment capability determination section that calculates the image quality adjustment capability value of the object from the correlation function and the image quality characteristic difference, wherein the image quality adjustment capability value is an interval scale based on Thurstone's law of comparative judgment or a cumulative probability which is the result of summing up the percentages of victories in paired comparison, and the image quality characteristic difference between the first or second corrected image and the instructor image is one selected from a group comprising: an average of differences in RGB Euclidean distance; an average of differences in lightness (L value of CIELAB); an average of differences in brightness (Y out of tristimulus values XYZ); an average of color differences (Eab); an average of differences in saturation; difference information of histograms related to such color information as contrast ratio, saturation, lightness, brightness, or hues; and a difference in amount of edges.

3. A non-transitory computer readable medium storing a program for measuring capability of an object to adjust image quality, the program causing a computer to execute:

a process of storing an instructor image serving as a target for image qualities of an evaluation image to be corrected for measurement;

a process of using a given correlation function obtained by a plurality of other users generating first corrected images by adjusting the image qualities of the evaluation image, calculating, by subjective evaluation of image qualities of the first corrected images, image quality adjustment capability values that represent capability of the other users to adjust the image qualities of the evaluation image, calculating differences in image quality characteristic between the first corrected images and the instructor image, and obtaining the correlation function between the image quality characteristic differences and the image quality adjustment capability values;

a process of inputting a second corrected image obtained after the image qualities of an evaluation image are adjusted by the object;

a process of calculating the image quality characteristic difference between the second corrected image and the instructor image; and a process of calculating the image quality adjustment capability value of the object from the correlation function and the image quality characteristic difference, wherein the image quality adjustment capability value is an interval scale based on Thurstone's law of comparative judgment or a cumulative probability which is the result of summing up the percentages of victories in paired comparison, and the image quality characteristic difference between the first or second corrected image and the instructor image is one selected from a group comprising: an average of differences in RGB Euclidean distance; an average of differences in lightness (L value of CIELAB); an average of differences in brightness (Y out of tristimulus values XYZ); an average of color differences (Eab); an average of differences in saturation; difference information of histograms related to such color information as contrast ratio, saturation, lightness, brightness, or hues; and a difference in amount of edges.

* * * * *